US005981111A

United States Patent [19]

Irita et al.

[11] Patent Number: 5,981,111

[45] Date of Patent: Nov. 9, 1999

[54] PROCESS FOR MANUFACTURING COLOR FILTER USING SILVER HALIDE LIGHT-SENSITIVE MATERIAL

[75] Inventors: Kiyoshi Irita; Makoto Yamada, both of Kanagawa, Japan

[73] Assignee: Fuji Photo Film Co., Ltd., Minami-Ashigara, Japan

[21] Appl. No.: 08/925,132

[22] Filed: Sep. 8, 1997

[30] Foreign Application Priority Data

| | | | |
|---|---|---|---|
| Sep. 9, 1996 | [JP] | Japan | 8-238154 |
| Oct. 18, 1996 | [JP] | Japan | 8-276027 |

[51] Int. Cl.[6] ............ G02B 5/20; G02F 1/1335

[52] U.S. Cl. ............ 430/7

[58] Field of Search ............ 430/7, 377, 383, 430/432

[56] References Cited

U.S. PATENT DOCUMENTS

| | | | |
|---|---|---|---|
| 5,571,663 | 11/1996 | Hirai | 430/504 |
| 5,576,127 | 11/1996 | Hirai et al. | 430/7 |

FOREIGN PATENT DOCUMENTS

| | | |
|---|---|---|
| 396824 | 11/1990 | European Pat. Off. . |
| 713137 | 5/1996 | European Pat. Off. . |
| 58-196506 | 11/1983 | Japan . |
| 60-216307 | 10/1985 | Japan . |
| 62-119501 | 5/1987 | Japan . |
| 62-170939 | 7/1987 | Japan . |
| 63-131103 | 6/1988 | Japan . |
| 4-042102 | 2/1992 | Japan . |
| 4-311923 | 11/1992 | Japan . |

*Primary Examiner*—John A. McPherson
*Attorney, Agent, or Firm*—Burns, Doane, Swecker & Mathis, LLP

[57] ABSTRACT

A process for manufacturing a color filter using a silver halide light-sensitive material comprising a support having thereon at least a light-sensitive silver halide, a color coupler and a hydrophilic binder, which process comprises the steps of: processing the silver halide light-sensitive material to obtain a color filter layer formed on the support, the color filter layer having a swelling ratio with water at 40° C. of 200% or less; and coating the color filter layer with a water-impermeable protective film having a thickness of from 0.1 to 10 μm.

6 Claims, 2 Drawing Sheets

R: RED
G: GREEN
B: BLUE

PROCESS FOR MANUFACTURING COLOR FILTER USING SILVER HALIDE LIGHT-SENSITIVE MATERIAL

FIELD OF THE INVENTION

The present invention relates to a process for manufacturing a color filter using a color light-sensitive material, which is suitable for easy production of a color filter having excellent molecular transmittance property, small thickness and excellent planeness. Further, the present invention relates to a process for manufacturing a color filter having high reliability under high humidity.

BACKGROUND OF THE INVENTION

A color filter is used as a color face plate for a cathode-ray tube display, a photoelectric transfer element plate for copying, a filter for a single tube-type color television camera, a flat panel display using liquid crystal or a color solid camera element.

Commonly used color filters are constituted by regularly arranged primary colors of red, green and blue, however, the color filter may comprise four or more color hues, if desired. For example, a color filter for camera tube or a color filter for liquid crystal display is required to have a black pattern (black matrix) for various purposes.

Specific examples of the arrangement of red, green and blue colors include mosaic arrangement, stripe arrangement and delta arrangement, and the arrangement may be selected according to the requirement.

Conventionally known methods for producing a color filter include evaporation, dyeing, printing, pigment dispersion, electrodeposition and electrodeposition transfer of a resist. However, color filters obtained by these methods are disadvantageous in that a complicated production process is required, pinholes or scratches are readily generated, the yield is low, and accuracy is not ensured.

In order to overcome these problems, a method of producing a color filter according to an external development method (for example, JP-A-55-6342, the term "JP-A" as used herein means an "unexamined published Japanese patent application") or an internal development method (for example, JP-A-62-148952 and JP-A-62-71950), using a silver halide light-sensitive material, has been investigated. In the case of using the color filter manufactured by these methods in a liquid crystal display or other precision electron devices, a thin film comprising, for example, indium oxide-tin oxide (ITO) is deposited on the color filter and subjected to patterning by means of photolithography or the like to form a transparent electrode. In order to prevent deterioration of the color filter in this process, the color filter layer needs be previously coated with a protective film. The protective film is required to have properties such as chemicals resistance, adhesion to the color filter, coatability, transparency and scratch resistance. As the protective film having such properties, an acrylic resin (for example, JP-A-58-196506, JP-A-62-119501), a polyglycidyl methacrylate-base resin (for example, JP-A-60-216307) and an epoxy-base resin (for example, JP-A-63-131103) have been proposed.

However, it has been found that when such a protective film is applied on a color filter manufactured using a silver halide light-sensitive material, the protective film is put into contact with outside air under high humidity for a long period of time, whereby wrinkles are generated due to difference in the swelling ratio between the color filter and the protective film, and the transmittance is considerably reduced. Furthermore, the adhesion of such a protective film to the color filter may be impaired. In addition, the color filter may undergo stains or discoloration because formation of the protective film requires high temperature and much time. Thus, there is a need of improvement, in particular, a method of forming a protective film not requiring high temperature in the hardening reaction is being demanded.

SUMMARY OF THE INVENTION

Accordingly, an object of the present invention is to provide a process for manufacturing a color filter which is prevented from impairment of reliability under high humidity conditions.

Another object of the present invention is to provide a process for manufacturing a color filter, which does not requires a complicated production process.

A further other object of the present invention is to provide a process for manufacturing a color filter having a protective film having excellent chemicals resistance.

A still other object of the present invention is to provide a process for manufacturing a color filter having a protective film in which the protective film can be formed at a low temperature within a short time.

Other objects and effects of the present invention will be apparent from the following description.

The above objects of the present invention have been achieved by providing:

(1) a process for manufacturing a color filter using a silver halide light-sensitive material comprising a support having thereon at least a light-sensitive silver halide, a color coupler and a hydrophilic binder, which process comprises the steps of:
 processing said silver halide light-sensitive material to obtain a color filter layer formed on the support, said color filter layer having a swelling ratio with water at 40° C. of 200% or less; and
 coating said color filter layer with a water-impermeable protective film having a thickness of from 0.1 to 10 μm;

(2) the process for manufacturing a color filter as described in above (1),
 wherein said processing of the silver halide light-sensitive material to provide the color filter layer comprises pattern exposure, color development and desilvering, and
 wherein said coating is conducted after dipping the color filter layer in an aqueous solution containing from 1 to 50% of a compound having at least one aldehyde group in its molecule at a temperature of from room temperature to 50° C. for from 10 seconds to 10 minutes;

(3) the process for manufacturing a color filter as described in above (1), wherein the protective film is obtained by hardening a prepolymer having two or more epoxy groups in its molecule;

(4) the process for manufacturing a color filter as described in above (1), wherein the protective film is formed by coating a composition containing at least a polymerizable compound having an ethylenic unsaturated group and a polymerization initiator on the color filter layer and applying either of both of light and heat energy thereon to polymerize the polymerizable compound simultaneous with or after the coating;

(5) the process for manufacturing a color filter as described in above (4), wherein the polymerization initiator is a photopolymerization initiator and the polymerizable compound is polymerized by applying at least light energy; and (6) the process for manufacturing a color filter as described in above (4), wherein the composition containing a polymerizable compound and a polymerization initiator further contains at least one compound represented by the following formula (I):

Formula (I)

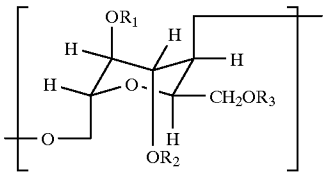

wherein $R_1$ to $R_3$ each independently represents a hydrogen atom, an alkyl group, an aralkyl group, an alkenyl group, an alkynyl group, $—COR_4$ (wherein $R_4$ represents a hydrogen atom, an alkyl group, an aralkyl group, an alkenyl group, an alkynyl group, an aryl group, an amino group or an alkoxy group), a nitro group, a sulfonic acid group, a cyano group or an amidino group.

In the present invention, the term "color filter layer" represents the portion of a color filter prepared by processing a silver halide light-sensitive material, which corresponds to the silver halide emulsion layer. The term "water-impermeable protective film" means a protective layer which imparts, to the color filter layer, such property as exhibiting substantially no swelling with respect to water.

DETAILED DESCRIPTION OF THE INVENTION

Figure 1:
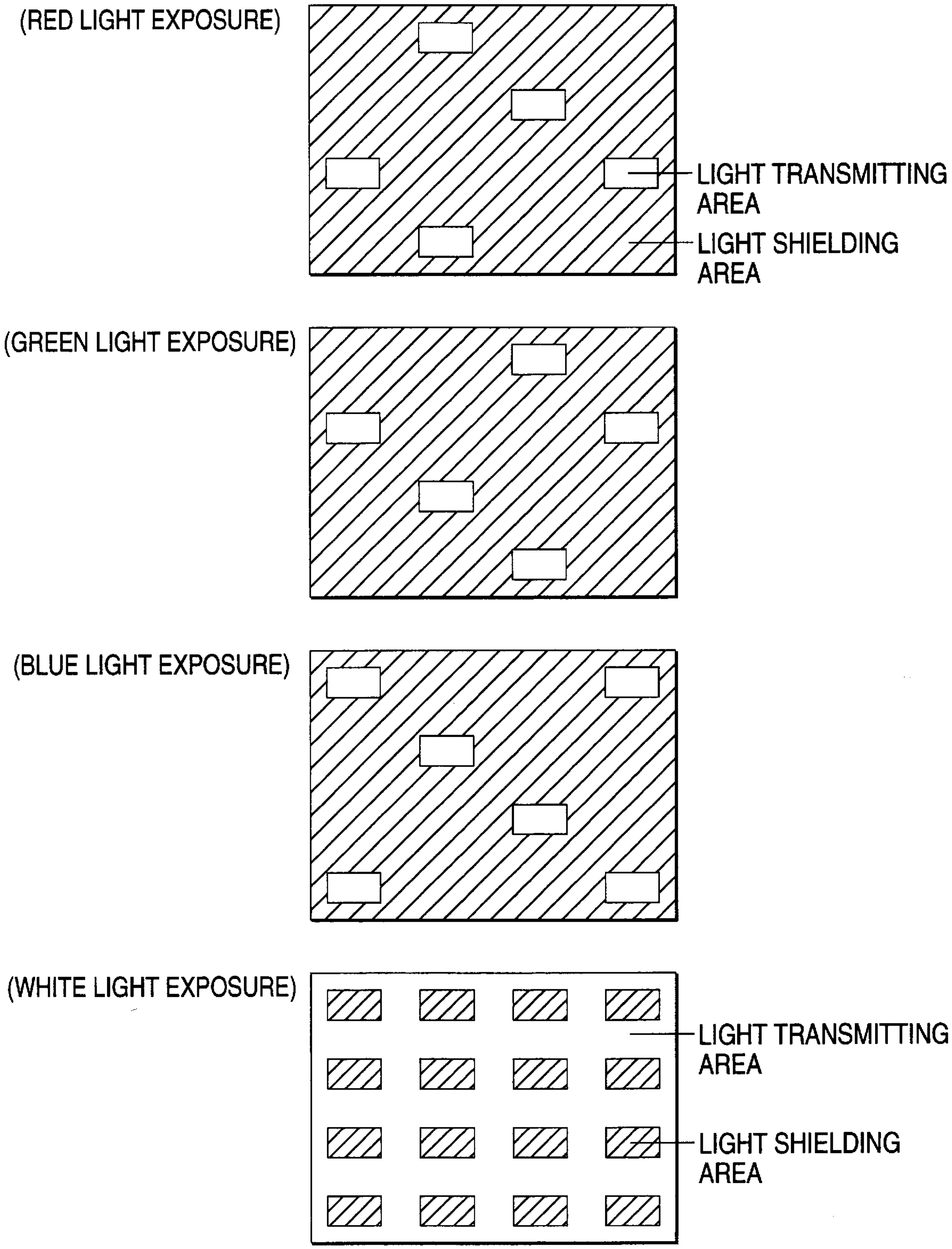
FIG. 1 is a schematic view showing one embodiment of mask filters for use in the exposure of the light-sensitive material of the present invention.

The present invention is described in detail below.

The present invention has been completed based on the finding that when a color filter manufactured using a silver halide light-sensitive material comprising a support having thereon at least a light-sensitive silver halide, a color coupler and a hydrophilic binder, is coated with a water-impermeable protective film, the protective film is put into contact with outside air under high humidity for a long period of time and thereby wrinkles and cracks are generated due to difference in the swelling ratio between the color filter layer and the protective layer. In addition, it has been found that when the light-sensitive material after pattern exposure, color development and desilvering, i.e., color filter layer is processed to have a swelling ratio with water at 40° C. to 200% or less, preferably 180% or less, before being coated with a protective film, wrinkles are not generated even if the protective film is put into contact with outside air for a long period of time.

The measure for reducing the swelling ratio of the color filter is not particularly limited as long as the objectives of the present invention can be achieved. However, after-hardening treatment is preferably used in the present invention to provide a good pattern image. The after-hardening treatment is generally conducted after the desilvering step.

Assuming that the thickness (dry thickness) of the color filter layer at a temperature of 25° C. and a humidity of 50% is "do" and the thickness of the swollen layer obtained by dropping deionized water (40° C.) on the color filter is "dw", the "swelling ratio of the color filter layer" as used in the present invention can be obtained by the following formula $$\text{Swelling ratio } (\%) = (dw - do)/do \times 100$$

In practice, the dry thickness and the swollen layer thickness can be determined using a normal layer thickness gauge.

Examples of the hardener for use in the above-described after-hardening include normal photographic hardeners described in *Research Disclosure* (*RD*), Vol. 176, No. 17643, page 26, ibid., No. 18716, page 651, left column, and ibid., No. 307105, pages 874 to 875. Among these hardeners, the compounds containing at least one aldehyde group in the molecule are preferred.

The after-hardening processing is preferably conducted by dipping the color filter prepared as described above in an after-hardening processing solution having a hardener concentration of from 1 to 50%, preferably from 5 to 30%, under conditions of giving a processing solution temperature of from room temperature (approximately 20° C.) to 50° C. for from 10 seconds to 10 minutes.

The protective film for use in the present invention is preferably formed by hardening a prepolymer having two or more epoxy groups in its molecule. The prepolymer having two or more epoxy groups is an epoxy resin capable of polymerization or cross-linking reaction, and examples thereof include conventionally known bisphenol A-type epoxy resin, bisphenol F-type epoxy resin, phenol novolak epoxy resin, cresol novolak epoxy resin, alicyclic epoxy resin, glycidyl ester-base epoxy resin, glycidyl amine-base epoxy resin and heterocyclic epoxy resin. These resins may be used individually or in combination. Representative structures of these resins are shown below.

Example of bisphenol A-type epoxy resin:

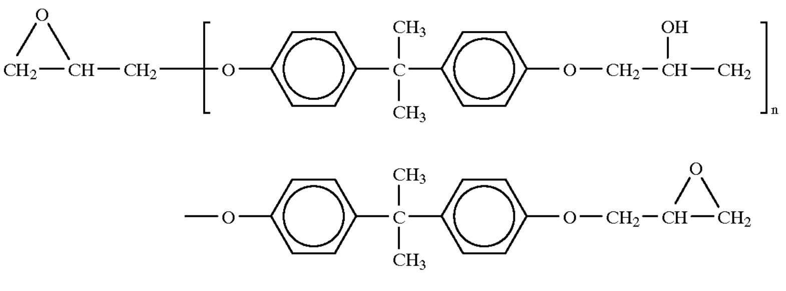

Example of bisphenol F-type epoxy resin:
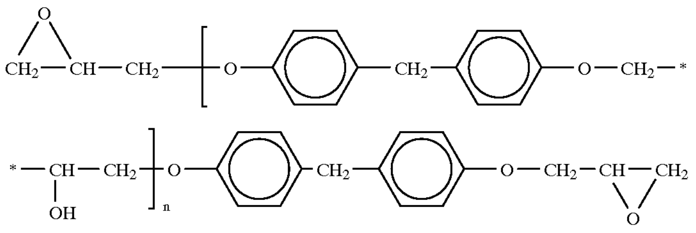
Example of phenol novolak epoxy resin:
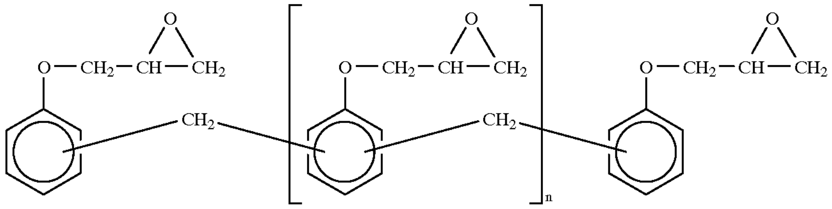
Example of cresol novolak epoxy resin:
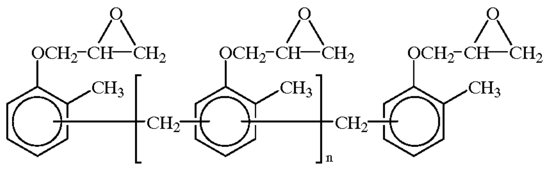
Examples of alicyclic epoxy resin:
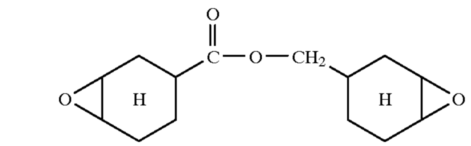
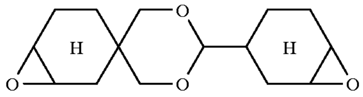
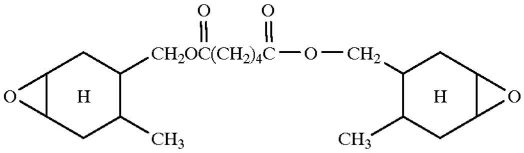
Examples of glycidyl ester-base epoxy resin:
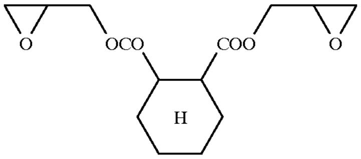
-continued
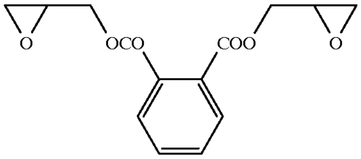
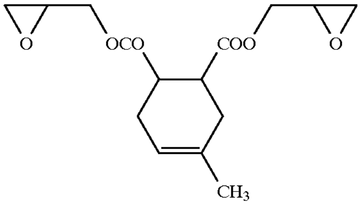
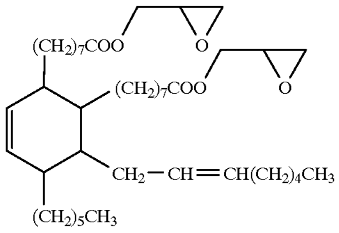
Example of glycidyl amine-base epoxy resin
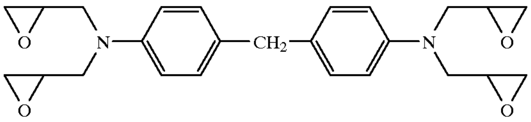
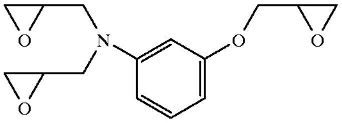

-continued

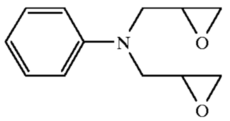

Example of heterocyclic epoxy resin:

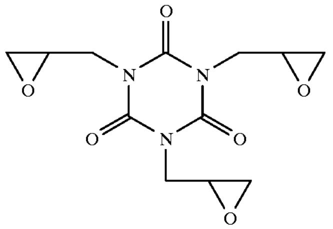

Examples of other epoxy resins:

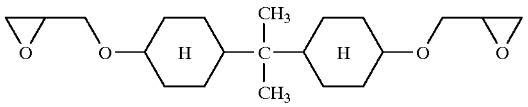

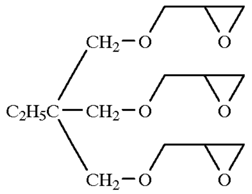

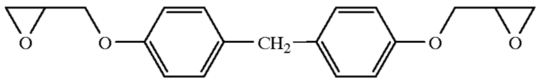

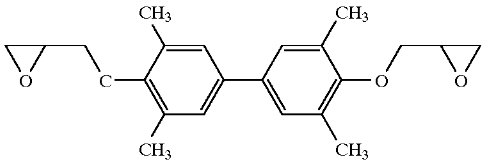

In addition to these epoxy resins, the prepolymer having two or more epoxy groups in its molecule includes compounds having a polymer structure containing at least two or more reactable epoxy groups in its molecule, such as the polyglycidyl methacrylate-base resin described in JP-A-60-216307.

Examples of the method of hardening the prepolymer having two or more epoxy groups in its molecule include a method of adding a hardener and causing hardening by heating, a method of adding a polymerization initiator which undertakes activation with active energy lines and causing hardening by irradiating active energy lines, and a method of hardening the prepolymer using these two methods in combination.

As the hardener added in hardening a prepolymer having two or more epoxy groups in its molecule by heating, a commercially available amine-base hardener, polyhydric carboxylic anhydride-base hardener or polyhydric carboxylic acid may be used.

Examples of the amine-base hardener include trimethylamine, triethylamine, tributylamine, dimethylbutylamine, dimethylpropylamine, methylethylpropylamine, benzyldimethylamine, benzyldiethylamine, pyridine and triethanolamine.

Examples of the polyhydric carboxylic anhydride-base hardener include an aliphatic dicarboxylic anhydride such as itaconic anhydride, maleic anhydride, succinic anhydride, citraconic anhydride and dodecenylsuccinic anhydride, an aliphatic polyhydric carboxylic dianhydride such as cyclopentanetetacarboxylic dianhydride and 1,2,3,4-butanetetracarboxylic dianhydride, and an aromatic polyhydric carboxylic anhydride such as phthalic anhydride, trimellitic anhydride, pyromellitic anhydride and benzophenonetetracarboxylic anhydride. Examples of the polyhydric carboxylic acid include an aliphatic polyhydric carboxylic acid such as itaconic acid, maleic acid, succinic acid, citraconic acid and cyclopentanetetracarboxylic acid, and an aromatic polyhydric carboxylic acid such as phthalic. acid, terephthalic acid, isophthalic acid, trimellitic acid, pyromellitic acid and benzophenonetetracarboxylic acid.

These amine-base hardeners, polyhydric carboxylic anhydride hardeners and polyhydric carboxylic acids may be used either individually or in combination of two or more kinds thereof.

As the polymerizing agent which is activated with active energy lines, a compound capable of releasing cation under irradiation of energy lines and hardening the epoxy resin by the cation polymerization reaction may be used, and an aromatic onium salt-base polymerization initiator is preferred.

Examples of the aromatic onium salt include the aromatic halonium salts described in JP-A-50-151996 and JP-A-50-158680, the aromatic onium salts of Group VIA described in JP-A-50-151997, JP-A-52-30899, JP-A-56-55420 and JP-A-55-125105, the aromatic onium salts of Group VA described in JP-A-50-158698, the oxosulfoxonium salts described in JP-A-56-8248, JP-A-56-149402 and JP-A-57-192429, the aromatic diazonium salts described in JP-B-49-17040 (the term "JP-B" as used herein means an "examined Japanese patent publication") and the thiopyrylium salts described in U.S. Pat. No. 4,139,655.

The polymerizable compound having an ethylenically unsaturated group, which can be used in the present invention, is not particularly limited and a known polymerizable compound can be used. In the present invention, a cross-linkable compound having a plurality of polymerizable functional groups within the molecule is preferred so as to increase the chemicals resistance. Examples of the compound having an ethylenically unsaturated group include an acrylic acid and a salt thereof, acrylic esters, acrylamides, a methacrylic acid and a salt thereof, methacrylic esters, methacrylamides, maleic anhydrides, maleic esters, itaconic esters, styrenes, vinyl ethers, vinyl esters, N-vinyl heterocyclic rings, allyl ethers, allyl esters, and a derivative thereof.

Examples of the compound having one ethylenically unsaturated group within the molecule include acrylic acid, n-butyl acrylate, cyclohexyl acrylate, 2-ethylhexyl acrylate, benzyl acrylate, furfuryl acrylate, ethoxyethoxyethyl acrylate, polyethylene oxide monoacrylate, polypropylene oxide monoacrylate, phenoxypolyethylene oxide monoacrylate, nonylphenoxypolyethylene oxide monoacrylate, dinonylphenoxypolyethylene oxide monoacrylate, nonylphenoxypolypropylene oxide monoacrylate, acrylamide, N-propylacrylamide, N-acroylmorpholine, methacrylic acid, methyl methacrylate, butyl methacrylate, benzyl methacrylate, methacrylamide, maleic anhydride, butyl monomaleate, dibutyl maleate, ethyl itaconate, di-2-ethylhexyl itaconate, styrene, chloromethylstyrene, vinyltoluene, methyl vinyl ether, phenyl vinyl ether, vinyl acetate, vinyl benzoate, butyl allyl ether, allyl acetate, N-vinylpyrrolidone, N-succinimide, vinylimidazole and vinylpyridine.

Examples of the compound having two ethylenically unsaturated groups within the molecule include calcium acrylate, ethylene glycol diacrylate, propylene glycol diacrylate, 1,4-butanediol diacrylate, neopentyl glycol diacrylate, 1,3-dioxolan diacrylate, 1,6-hexanediol diacrylate, glycerin diacrylate, polyethylene oxide diacrylate, polypropylene oxide diacrylate, tricyclodecane dimethylol diacrylate, bisphenol A diacrylate, polyoxyethylenated bisphenol A diacrylate, polyoxyethlenated bisphenol F diacrylate, polyoxyethlenated bisphenol S diacrylate, 2-(2-hydroxy-1,1-dimethylethyl)-5-hydroxymethyl-5-ethyl-1,3-dioxane diacrylate, methylenebisacrylamide, N,N'-acryloylethylenediamine, N,N'-acryloylpropylenediamine, magnesium methacrylate, ethylene glycol dimethacrylate, 1,4-butanediol methacrylate, neopentyl glycol dimethacrylate, 1,6-hexanediol methacrylate, polyoxyethylenated bisphenol A dimethacrylate, tricyclodecanedimethylol dimethacrylate, 2-(2-hydroxy-1,1-dimethylethyl)-5-hydroxymethyl-5-ethyl-1,3-dioxane dimethacrylate, methylenebismethacrylamide, N,N'-methacryloylethylenediamine, divinylbenzene, diallyl phthalate, allyl acrylate and allyl methacrylate.

Examples of the compound having three ethylenically unsaturated groups within the molecule include aluminum acrylate, trimethylolpropane triacrylate, pentaerythritol triacrylate, trimethylolpropane polyoxyethylene triacrylate, polyoxyethylenated trimethylolpropane triacrylate, N,N', N"-trihydroxyethyl-1,3,5-triazine-2,4,6-trione triacrylate, glycerin triacrylate, polyoxyethylenated glycerine triacrylate, trimethylolpropane trimethacrylate and pentaerythritol trimethacrylate.

Examples of the compound having four or more ethylenically unsaturated groups within the molecule include pentaerythritol tetraacrylate, ditrimethylolpropane tetraacrylate, dipentaerythritol pentaacrylate, dipentaerythritol hexaacrylate, polyhydroxyoligoester polyacrylate, polyhydroxyoligourethane polyacrylate, pentaerythritol tetramethacrylate, ditrimethylolpropane tetramethacrylate, dipentaerythritol hexamethacrylate and polyhydroxyoligoester polymethacrylate.

The polymerizable compounds described in JP-A-2-16563 can also be used in the color filter of the present invention.

Specific examples including the above-described polymerizable compounds are shown below.

M-1

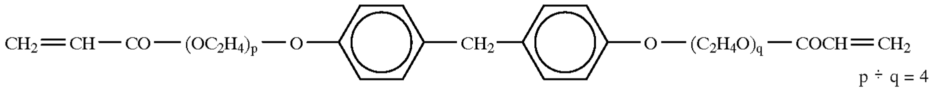

p ÷ q = 4

M-2

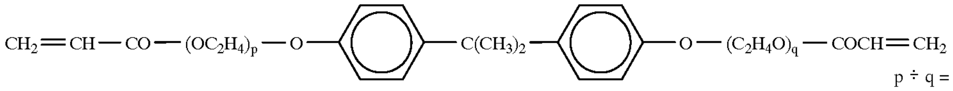

p ÷ q = 4

M-3

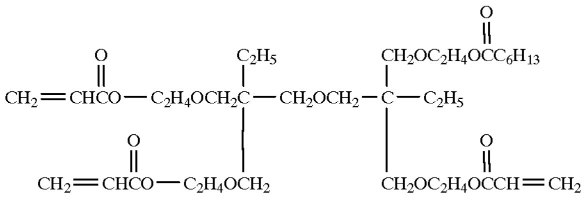

M-4

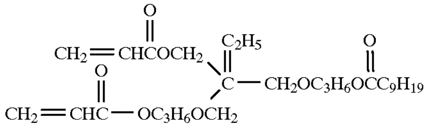

M-5

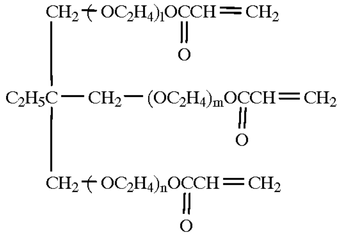

1 ÷ m ÷ n = 3.5

M-6

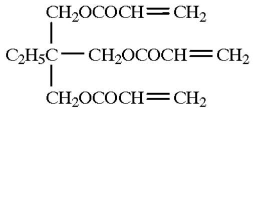

-continued

M-7

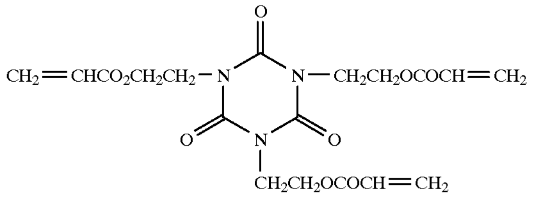

M-8

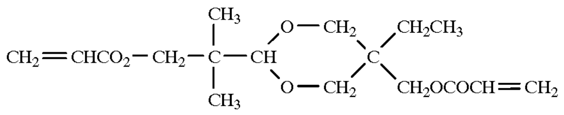

M-9

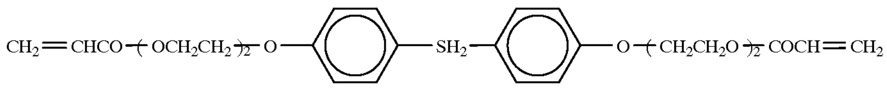

M-10

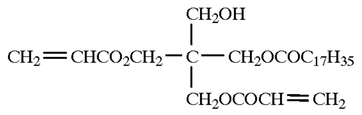

M-11

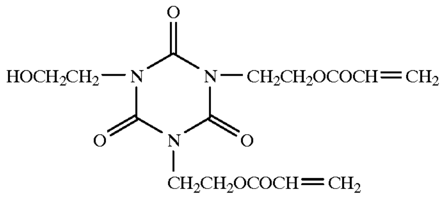

M-12

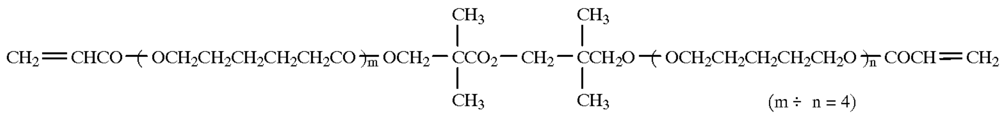

(m ÷ n = 4)

M-13

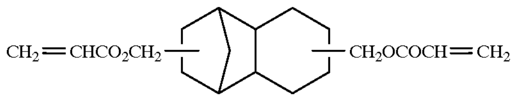

M-14

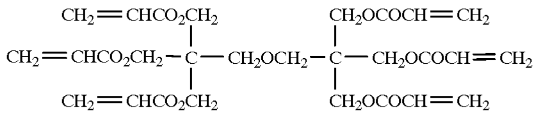

M-15

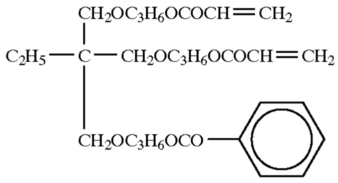

Most of these polymerizable compounds are known and can be easily synthesized by referring to publications. The above-described polymerizable compounds may be used either individually or in combination of two or more thereof. In the present invention, the polymerizable compound is preferably used in an amount of from 0.001 to 100 g/m$^2$, more preferably from 0.01 to 10 g/m$^2$.

Examples of the photopolymerization initiator which can be used in the present invention, include a carbonyl compound (for example, α-alkoxyphenyl ketones, polycyclic quinones, benzophenones, substituted benzophenones, xanthones, thioxanthones, benzoins), halogen-containing compounds (for example, chlorosulfonyl and chloromethyl polynuclear aromatic compounds, chlorosulfonyl and chloromethyl heterocyclic compounds, chlorosulfonyl- and chloromethylbenzophenones, fluorenones), haloalkanes, α-halo-α-phenylacetophenones, photoreducing dye-reducing agent redox couples, organic sulfur compounds, peroxides, photosemiconductors (for example, titanium dioxide, zinc oxide), metal ions (for example, iron(1) ion, metal carbonyl, metal complex, uranyl salt), silver halide, azole and diazo compounds and photoreducing dyes. Further, the compounds described in T. Oster et al, *Chemical Review,* Vol. 68, pp. 125–151 (1968); Kosar, Light-Sensitive Systems, pp. 158–192, John Wiley & Sons (1963); *Fine Chemical,* Vol. 16, No. 9, pp. 5–19 (1987); *Shigaisen Koka (UV Hardening) System,* pp. 63– 147, Sogo Gijutsu Center (1989); and *Photopolymer Technology,* pp. 85–94, Nikkan Kogyo Shinbun Sha (1988) may be used. Furthermore, photopolymerization initiators comprising a cyanine dye and a borate ion described in U.S. Pat. No. 4,772,530 may be used.

Specific examples of the photopolymerization initiator include 2,2-dimethoxy-2-phenylacetophenone, 2-methyl[4-(methylthio)phenyl]-2-morpholino-1-propane, 9,10-anthraquinone, benzophenone, phenanthrenequinone, Michler's ketone, 4,4'-diethylaminobenzophenone, xanthone, chloroxanthone, thioxanthone, chlorothioxanthone, 2,4-diethylthioxanthone, chlorosulfonylthioxanthone, chlorosulfonylanthraquinone, chloromethylanthracene, chloromethylbenzothiazole, chlorosulfonylbenzoxazole, 2,4,6-trichloromethyl-1,3,5-S-triazine, chloromethylquinoline, chloromethylbenzophenone, chlorosulfonylbenzophenone, fluorenone, carbon tetrabromide, benzoisobutyl ether, benzoisopropyl ether, and a combination of 2,2'-bis (chlorophenyl)-4,4',5,5'-tetraphenylimidazole with 2-mercapto-5-methylthio-1,3,4-thiadiazole.

The photopolymerization initiator using a photoreducing dye generally comprises a photoreducing dye and a hydrogen-donative compound and it is considered that a polymerizable radical is generated by the reaction between the photoexcited dye and the hydrogen-donative compound. Examples of the photoreducing dye include carbonyl compounds such as methylene blue, thionine, Rose Bengal, erythrosine-B, eosine, Rhodamine, Phloxine-B, Safranine, acriflavine, riboflavin, fluorescein, uranine, benzoflavin, N,N,N',N'-tetra-n-butylthionine, N,N,N',N'-tetramethyl-4-dodecylsafranine, Acridine Orange, Acridine yellow, 9,10-phenanthrenequinone and benzanthrone. Examples of the hydrogen-donative compound include β-diketones such as dimedone and acetylacetone, amines such as triethanolamine, diethanolamine, monoethanolamine, dimethylamine, diethylamine, tetramethylethylenediamine, triethylamine and phenyihydrazine, sulfinic acids and a salt thereof such as p-toluenesulfinic acid, benzenesulfinic acid and p-(N-acetylamino)benzenesulfinic acid, N-phenylglycine, L-ascorbic acid, thiourea and allylthiourea. The molar ratio of the photoreducing dye to the hydrogen-donative compound is such that the photoreducing dye is from 0.005 to 3 mol, preferably from 0.05 to 1 mol, per mol of the hydrogen-donative compound.

In the present invention, the photopolymerization initiators may be used individually or in combination of two or more thereof. In the present invention, the content of the photopolymerization initiator is preferably from 0.01 to 30 wt %, more preferably from 0.1 to 10 wt %, of the polymerizable compound.

The thermopolymerization initiator which can be used in the present invention is a compound which generally undergoes thermal decomposition under heating to generate a polymerization initiating seed and a usual radical polymerization initiator can be used. Examples thereof include organic peroxides such as alkyl peroxide, acyl peroxide, ketone peroxide, alkylhydro-peroxide, peroxydicarbonate and sulfonyl peroxide, inorganic peroxides, azo compounds such as azonitrile, sulfinic acids, bisazides and diazo compounds.

Specific examples thereof include cumene hydroperoxide, t-butyl hydroperoxide, dicumyl peroxide, di-t-butyl peroxide, benzoyl peroxide, lauroyl peroxide, peroxodisulfate, hydrogen peroxide, potassium persulfate, ammonium persulfate, perborate, 2,2'-azobisisobutyronitrile, 1,1'-azobis(1-cyclohexane-1-carbonitrile), dimethyl-2,2'-azoisobisbutyrate, 2,2'-azobis(2-methylbutyronitrile), 2,2'-azobis(2-amidinopropane) dicarbonate, sodium azobiscyanovalerate, 2,2'-azobis(2,4-dimethylvaleronitrile), 2,2'-azobis[2-(2-imidazolin-2-yl) propane], 2,2'-azobis{2-methyl-N-[1,1-bis(hydroxymethyl)-2-hydroxyethyl]-propionamide}, 2,2'-azobis{2-methyl-N-[1,1-bis(hydroxymethyl)ethyl]propionamide}, 2,2'-azobis [2-methyl-N-(2-hydroxyethyl)propionamide], 2,2'-azobis(2-cyanopropanol), 2,2'-azobis(2,4,4-trimethylpentane) and sodium p-toluene-sulfinate. Further, the compounds described in *Kobunshi Jikken-gaku* 4 *"Fuka-jugo•Kaikan-jugo"* (*Polymer Experimental Study* 4 *"Addition Polymerization•Ring-Opening Polymerization"*), pp. 6–18, Kyoritsu Shuppan (1983) and the compounds described in *Polymer Handbook, 2nd Ed.,* pages II-3 to II-40, Wiley Interscience (1975) may also be used. In the present invention, the thermopolymerization initiators may be used individually or in combination of two or more thereof. The thermopolymerization initiator is preferably used in an amount of from 0.1 to 120 wt %, more preferably from 1 to 10 wt %, based on the polymerizable compound.

In the present invention, of the thermopolymerization initiator and the photopolymerization, the photopolymerization initiator is preferably used, however, a thermopolymerization initiator and a photopolymerization initiator can be used in combination.

The amount of light and/or heat energy to be applied to the composition containing the above described polymerizable compound and polymerization initiator, which is coated on the color filter, is appropriately selected depending on the objectives based on the common knowledge of the skilled person in the art. Also, the measures for applying the light energy and the heat energy can be appropriately selected from those known in the art.

The compound represented by Formula (I) is described below. In the formula, $R_1$ to $R_3$ each represents a hydrogen atom, an alkyl group, an aralkyl group (an alkyl or aralkyl group which may be substituted, e.g., methyl, trifluoromethyl, benzyl, chloromethyl, dimethylaminomethyl, ethoxycarbonylmethyl, aminomethyl, acetylaminomethyl, ethyl, 2-(4-dodecanoylaminophenyl)ethyl, carboxyethyl, allyl, 3,3,3-trichloropropyl, n-propyl, iso-propyl, n-butyl, iso-butyl, sec-butyl), an alkenyl group, an alkynyl group, —$COR_4$ (wherein $R_4$ represents a hydrogen atom, an alkyl group (an alkyl group which may be substituted, e.g., methyl, ethyl, propyl, iso-propyl, n-butyl, t-butyl, n-pentyl, sec-pentyl, t-pentyl, cyclopentyl, n-hexyl, sec-hexyl, t-hexyl, cyclohexyl, n-octyl, sec-octyl, t-octyl, n-decyl, n-undecyl, n-dodecyl, n-tetradecyl, n-pentadecyl, n-hexadecyl, sec-hexadecyl, t-hexadecyl, n-octadecyl, t-octadecyl), an alkenyl group (an alkenyl group which may be substituted, e.g., vinyl, 2-chlorovinyl, 1-methylvinyl, 2-cyanovinyl, cyclohexen-1-yl), an alkynyl group (an alkynyl group which may be substituted, e.g., ethynyl, 1-propynyl, 2-ethoxycarbonylethynyl), an aryl group (an aryl group which may be substituted, e.g., phenyl), an amino group (an amino group which may be substituted, e.g., —$NH_2$, dimethylamino) or an alkoxy group (an alkoxy group which may be substituted, e.g., methoxy, ethoxy)), a nitro group, a sulfonic acid group, a cyano group or an amidino group.

These compounds are known as a cellulose derivative and described in *Kinosei Cellulose no Kaihatsu* (*Development of Functional Cellulose*), *CMC* (1985), *Cellulose Structural and Functional Aspects,* ELLIS HORWOOD LIMITED (1989) and *Tatorui Kagaku* (*Polysaccharides Chemistry*), Kyoritsu Shuppan (1955).

In the present invention, the compound represented by Formula (I) is effective in improving adhesion between the protective layer and the color filter layer.

The compounds represented by Formula (I) of the present invention may be used individually or in combination of two or more thereof. The compound represented by Formula (I) of the present invention is preferably used in an amount of rom 0.001 to 100 parts by weight, more preferably from 0.01 to 10 parts by weight, based on the polymerizable compound.

In order to achieve further firm adhesion between the protective layer and the color filter (gelatin) layer, it is preferred that the uppermost layer (a layer which comes into contact with the protective film) of the color filter contains colloidal silica, or that the coating composition for the protective film contains a silane coupling agent.

The colloidal silica preferably has an average particle size of from 0.1 to 500 nm, more preferably from 1 to 50 nm. Such a colloidal silica is commercially available under the trade name of Snowtex (produced by Nissan Kagaku Kogyo KK), Ludox (produced by U.S. Du Pont), Synton (produced by U.S. Monsanto) or Nalcoag (produced by U.S. Nalco Chemical). The colloidal silica is preferably used in an amount of from 10 to 50 wt % based on the amount of binder. The colloidal silica may be added to other layers for the purpose of improving layer properties.

The above-described hydrolyzable organic silane compound may be added in place of the colloidal silica.

The silane coupling agent is preferably a compound having a reactive substituent within the molecule, such as vinyl group, methacryloyl group, hydroxyl group, carboxyl group, amino group, isocyanate group or epoxy group. Examples of such a compound include vinyltrimethoxysilane, γ-methacryloxypropyltrimethoxysilane, γ-isocyanatopropyltrimethoxysilane, γ-glycidoxypropyltriethoxysilane, γ-glycidoxypropyltrimethoxysilane, 3,4-epoxycyclohexylethyltrimethoxysilane, 3,4-epoxycyclohexylethyltriethoxysilane and γ-glycidoxypropyltriacetoxysilane. These silane coupling agents may be used individually or in combination of two or more thereof. The silane coupling agent is preferably used in an amount of from 0.1 to 50 wt %, based on the coating composition for the protective film.

In the present invention, the method of coating a composition for forming the protective film is not particularly limited and various methods such as spray coating, bar code coating and spin coating may be used.

In the present invention, the protective film is generally formed to have a thickness of from 0.1 to 10 μm.

The composition which forms the protective film for use in the present invention, is usually dissolved in a solvent, coated on the color filter layer and hardened by heating, irradiating with active energy lines or both of them. The solvent is not particularly limited as long as it dissolves the composition of forming the protective film for use in the present invention, does not react with the components thereof and gives no adverse effect such as dye extraction on the color filter prepared using the silver halide light-sensitive material.

Specific examples thereof include an aromatic solvent such as benzene, toluene and xylene, a ketone-base solvent such as acetone, methyl ethyl ketone, methyl isobutyl ketone and cyclohexanone, an ether-base solvent such as diethyl ether, isopropyl ether, tetrahydrofurane, dioxane, ethylene glycol dimethyl ether and ethylene glycol diethyl ether, an ester-base solvent such as ethyl acetate, n-propyl acetate, isopropyl acetate, n-butyl acetate, ethylene glycol monomethyl ether acetate, ethylene glycol monobutyl ether acetate, diethylene glycol monomethyl ether acetate, diethylene glycol monoethyl ether acetate, propylene glycol monomethyl ether acetate, propylene glycol monoethyl ether acetate and γ-butyrolactone, and an amide-base solvent such as dimethylformamide, dimethylacetamide and N-methylpyrrolidone. These solvents may be used individually or in combination of two or more kinds thereof.

The method of dissolving the composition of forming the protective film for use in the present invention in the solvent to prepare a composition solution, is not particularly limited. All components may be simultaneously dissolved to prepare the composition solution or, if desired, respective components may be dissolved in two or more solvents and these may be mixed upon use to prepare the composition solution. Further, a stabilizer such as antioxidant and ultraviolet absorbent, may be added to the composition constituting the protective film .

The silver halide grain which can be used in the light-sensitive material for use in the present invention includes silver chloride, silver bromide, silver iodochloride, silver iodobromide, silver chlorobromide and silver iodochlorobromide. The silver chloride content is preferably 50 mol % or more, more preferably 70 mol % or more. The silver iodide content is preferably 2 mol % or less, more preferably 1 mol % or less, still more preferably 0.5 mol % or less.

The silver halide emulsion for use in the present invention may be either a surface latent image-type emulsion or an internal latent image-type emulsion. The internal latent image-type emulsion is used as a direct reversal emulsion in combination with a nucleating agent or light fogging. The crystal structure may be homogeneous, or a multiple structure grain having different halogen compositions between the inside of the grain and the surface of the grain may also be used. Further, silver halide having a different composition may be joined to the grain by epitaxial conjunction. Furthermore, a compound other than silver halide, such as silver rhodanate or lead oxide, may be joined thereto.

In the high silver chloride emulsion for use in the present invention, a grain having a silver bromide localized phase in a layer or non-layer form, in the inside and/or the surface of silver halide may also be used. The halogen composition in the localized phase preferably has a silver bromide content of at least 20 mol %, more preferably in excess of 30 mol %. The silver bromide content in the silver bromide localized phase can be analyzed by the X-ray diffraction method. The application method of the X-ray diffraction method to silver halide grains is described in, for example, C. R. Berry and S. J. Marino, *Photographic Science and Technology,* Vol. 2, p. 149 (1955), and ibid., Vol. 4, p. 22 (1957). The silver bromide localized phase may be present in the inside of a grain, or at the edge or corner of or on the plane of the grain surface, however, it is preferably joined to the corner part of a grain by epitaxial conjunction.

In order to achieve a large specific surface area and a high development activity while reducing the silver amount as much as possible, the average grain size of silver halide grains for use in the present invention is preferably from 0.05 to 0.9 μm, more preferably from 0.1 to 0.5 μm. In the case of tabular grains, the thickness is preferably from 0.05 to 0.9 μm, more preferably from 0.1 to 0.5 μm.

A monodisperse emulsion having a narrow grain size distribution may also be used. The monodisperse emulsion is a silver halide emulsion having a grain size distribution such that 80% or more by number or by weight of all grains have a size falling within ±30% of the average grain size. Also, a monodisperse emulsion having a coefficient of variation of 20% or less, preferably 15% or less, may be used.

A polydisperse emulsion having a wide grain size distribution may also be used.

The silver halide emulsion which can be used in the present invention may be prepared by the method described, for example, in (*RD*) *"I. Emulsion Preparation and Types"*, Vol. 176, No. 17643, pp. 22–23 (December, 1978), ibid., No. 18716, p. 648 (November, 1979), P. Glafkides, *Chimie et Physique Photographique,* Paul Montel (1967), G. F. Duffin, *Photographic Emulsion Chemistry,* the Focal Press (1966), and V. L. Zelikman et al, *Making and Coating Photographic Emulsion,* the Focal Press (1964).

The monodisperse emulsions described in U.S. Pat. Nos. 3,574,628 and 3,655,394 and British Patent 1,413,748 are also preferred.

Furthermore, tabular grains having an aspect ratio of about 5 or more may also be used in the present invention. The tabular grains may be easily prepared by the methods described in Gutoff, *Photographic Science and Engineering,* Vol. 14, pp. 248–257 (1970), U.S. Pat. Nos. 4,434,226, 4,414,310, 4,433,048 and 4,439,520, and British Patent 2,112,157.

A mixture of grains having various crystal forms may also be used.

The light-sensitive silver halide emulsion is usually a silver halide emulsion subjected to chemical sensitization. The chemical sensitization of the light-sensitive silver halide emulsion for use in the present invention may be performed by the sensitization method known to the emulsion for normal light-sensitive materials, for example, chalcogen sensitization such as sulfur sensitization, selenium sensitization and tellurium sensitization, noble metal sensitization using gold, platinum or palladium, or reduction sensitization, and these sensitization methods may be used individually or in combination (see, for example, JP-A-3-110555). The chemical sensitization may be performed in the presence of a nitrogen-containing heterocyclic compound (see, JP-A-62-253159). Further, an antifoggant described below may be added after completion of the chemical sensitization. More specifically, the methods described in JP-A-5-45833 and JP-A-62-40446 may be used.

At the time of chemical sensitization, the pH is preferably from 5.3 to 10.5, more preferably from 5.5 to 8.5, and the pAg is preferably from 6.0 to 10.5, more preferably from 6.8 to 9.0.

The coating amount of the light-sensitive silver halide emulsion for use in the present invention is from 1 $mg/m^2$ to 10 $g/m^2$ as calculated in terms of silver.

The light-sensitive silver halide emulsion for use in the present invention is subjected to spectral sensitization with a methine dye or the like so that the light-sensitive silver halide can have spectral sensitivity to green, red or infrared. Further, a blue-sensitive emulsion may be subjected to spectral sensitization in the blue region, if desired.

The dye which can be used includes cyanine dyes, merocyanine dyes, complex cyanine dyes, complex merocyanine dyes, holopolar cyanine dyes, hemicyanine dyes, styryl dyes and hemioxonol dyes.

Specific examples thereof include sensitizing dyes described in U.S. Pat. No. 4,617,257, JP-A-59-180550, JP-A-64-13546, JP-A-5-45828 and JP-A-5-45834.

These sensitizing dyes may be used individually or in combination thereof, and the combination of sensitizing dyes is often used for the purpose of supersensitization or controlling the wavelength of spectral sensitivity.

Together with the sensitizing dye, a dye which itself has no spectral sensitization effect, or a compound which absorbs substantially no visible light, but exhibits supersensitization may be incorporated into the emulsion (for example, those described in U.S. Pat. No. 3,615,641 and JP-A-63-23145).

The sensitizing dye may be added to the emulsion before, during or after chemical ripening, or may be added before or after nucleation of silver halide grains as in U.S. Pat. Nos. 4,183,756 and 4,225,666. The sensitizing dye or the supersensitizer may be added as a solution of an organic solvent such as methanol, a dispersion of gelatin or a solution of a surface active agent. The addition amount is generally on the order of from $10^{-8}$ to $10^{-2}$ mol per mol of silver halide.

The additives for use in these steps are described in *RD,* No. 17643, ibid., No. 18716 and ibid., No. 307105, and the pertinent portions thereof are summarized below.

| Kinds of Additives | RD17643 | RD18716 | RD307105 |
| --- | --- | --- | --- |
| 1. Chemical sensitizer | p. 23 | p. 648, right col. | p. 866 |
| 2. Sensitivity increasing agent | | p. 648, right col. | |
| 3. Spectral sensitizer, supersensitizer | pp. 23–24 | p. 648, right col.–p. 649, right col. | pp. 866–868 |
| 4. Brightening agent | p. 24 | p. 648, right col. | p. 868 |
| 5. Antifoggant, stabilizer | pp. 24–25 | p. 649, right col. | pp. 868–870 |
| 6. Light absorbent, filter dye, UV absorbent | pp. 25–26 | p. 649, right col.–p. 650, left col. | p. 873 |
| 7. Dye Image Stabilizer | p. 25 | p. 650, left col. | p. 872 |
| 8. Hardener | p. 26 | p. 651, left col. | pp. 874–875 |
| 9. Binder | p. 26 | p. 651, left col. | p. 873–874 |
| 10. Plasticizer, lubricant | p. 27 | p. 650, right col. | p. 876 |
| 11. Coating aid, surface active agent | pp. 26–27 | p. 650, right col. | pp. 875–876 |
| 12. Antistatic agent | p. 27 | p. 650, right col. | pp. 876–877 |

The color developing agent which can be used in the present invention may be sufficient if the oxidation product of the developing agent produced upon development of silver halide makes coupling reaction with a coupler to form a dye, and those known in the photographic art may be used. Specific examples of the color developing agent are described in T. H. James, *The Theory of the Photographic Process,* 4th ed., pp. 291–334 and pp. 353–361. The particularly preferred color developing agent is a p-phenylenediamine derivative.

In the present invention, various known color couplers may be used together with the coupler for use in the present invention, and specific examples thereof are described in patents cited in *Research Disclosure* (*RD*), No. 17643, VII-C to G.

As the coupler for use in the present invention, a two-equivalent coupler substituted by a splitting-off group is preferred more than a four-equivalent color coupler having a hydrogen atom at the active site because the coated silver amount can be reduced.

A representative example of the yellow coupler which can be used in the present invention is an oil protect-type acylacetamide-base coupler. Specific examples thereof are described in U.S. Pat. Nos. 2,407,210, 2,875,057 and 3,265,506. In the present invention, a two-equivalent yellow coupler is preferably used and representative examples thereof include the oxygen atom-releasing yellow couplers described in U.S. Pat. Nos. 3,408,194, 3,447,928, 3,935,501 and 4,022,620, and the nitrogen atom-releasing yellow couplers described in JP-B-58-10739, U.S. Pat. Nos. 4,401,752 and 4,326,024, *RD,* 18053 (April, 1979), British Patent 1,425,020, West German Patent Publication (OLS) Nos. 2,219,917, 2,261,361, 2,329,587 and 2,433,812. α-pivaloylacetanilide-base couplers are excellent in the fastness, particularly light fastness, of the colored dye, whereas α-benzoylacetanilide-base couplers can provide a high color density.

The magenta coupler which can be used in the present invention includes oil protect-type, preferably 5-pyrazolone-base couplers and pyrazoloazole-base couplers such as pyrazolotriazoles. The 5-pyrazolone-base coupler is preferably substituted by an arylamino group or an acylamino group at the 3-position in view of hue and color density of the colored dye. Representative examples thereof are described in U.S. Pat. Nos. 2,311,082, 2,343,703, 2,600,788, 2,908,573, 3,062,653, 3,152,896 and 3,936,015. The splitting-off group of the two-equivalent 5-pyrazolone-base coupler is particularly preferably the nitrogen atom splitting-off group described in U.S. Pat. No. 4,310,619 or the arylthio group described in U.S. Pat. No. 4,351,897. The 5-pyrazolone-base coupler having a ballast group described in European Patent 73,636 can provide a high color density.

The pyrazoloazole-base coupler includes the pyrazolobenzimidazoles described in U.S. Pat. No. 3,369,879, preferably the pyrazolo[5,1-c][1,2,4]triazoles described in U.S. Pat. No. 3,725,067, the pyrazolotetrazoles described in *Research Disclosure,* No. 24220 (June, 1984), and the pyrazolopyrazoles described in *Research Disclosure,* No. 24230 (June, 1984). In view of small yellow side absorption and light fastness of the colored dye, the imidazo[1,2-b]pyrazoles described in European Patent 119,741 are preferred, and the pyrazolo[1,5-b][1,2,4]triazole described in European Patent 119,860 is particularly preferred.

The cyan coupler which can be used in the present invention includes the naphthol-base couplers described in U.S. Pat. Nos. 2,474,293, 4,052,212, 4,146,396, 4,228,233 and 4,296,200, the phenolic cyan couplers having an alkyl group of ethyl or greater group at the meta-position of the phenol nucleus described in U.S. Pat. No. 3,772,002, the 2,5-diacylamino-substituted phenolic couplers described in U.S. Pat. Nos. 2,772,162, 3,758,308, 4,126,396, 4,334,011 and 4,327,173, West German Patent Publication (OLS) No. 3,329,729 and JP-B-3-18175, and the phenolic couplers having a phenylureido group at the 2-position and an acylamino group at the 5-position described in U.S. Pat. Nos. 3,446,622, 4,333,999, 4,451,559 and 4,427,767. In particular, as the coupler having excellent heat resistance and light resistance, the carbostyryl-base couplers described in JP-A-7-294714 are preferably used in the present invention.

Other than the above-described couplers, various couplers described below can be used in the present invention.

Typical examples of the dye forming polymer coupler are described in U.S. Pat. Nos. 3,451,820, 4,080,211 and 4,367,282, and British Patent 2,102,173.

A coupler which releases a photographically useful residue upon coupling is also preferably used in the present invention. Preferred examples of the DIR coupler which releases a development inhibitor are described in patents cited in *RD,* No. 17643, Item VII to F, JP-A-57-151944, JP-A-57-154234, JP-A-60-184248 and U.S. Pat. No. 4,248,962.

As the coupler which imagewise releases a nucleating agent or a development accelerator upon development, those described in British Patents 2,097,140 and 2,131,188, JP-A-59-157638 and JP-A-59-17084U are preferred.

In addition, the coupler which can be used in the light-sensitive material of the present invention includes the competitive couplers described in U.S. Pat. No. 4,130,427, the polyequivalent couplers described in U.S. Pat. Nos. 4,283,472, 4,338,393 and 4,310,618, the DIR redox compound-releasing couplers described in JP-A-60-185950, and the couplers which release a dye capable of recovering the color after being released, described in European Unexamined Patent Publication 173,302A.

The coupler for color correction to black is not limited to those of forming yellow, magenta or cyan color, but those of forming, for example, brown, orange, violet or black color may be used.

The coupler for use in the present invention may be incorporated into the light-sensitive material by various known dispersion methods.

Examples of the high boiling point solvent for use in the oil-in-water dispersion method are described in U.S. Pat. No. 2,322,027. The amount of the high boiling point solvent is 10 g or less, preferably 5 g or less, more preferably from 0.1 to 1 g, per g of the coupler, and 2 g or less, preferably 1 g or less, more preferably 0.5 g or less, per g of the binder. The size of the coupler dispersion (coupler emulsified product) obtained by the oil-in-water dispersion method is from 0.05 to 0.9 μm, preferably from 0.1 to 0.5 μm.

The process and effect of the latex dispersion method and specific examples of the latex for impregnation are described in U.S. Pat. No. 4,199,363, West German Patent Publication (OLS) Nos. 2,541,274 and 2,541,230.

In the light-sensitive material for use in the present invention, the coupler-containing layer preferably uses the dye image preservability improving compound described in European Unexamined Patent Publication EP0,277,589A2. In particular, it is preferably used in combination with a pyrazoloazole-base magenta coupler.

More specifically, Compound (F) which reacts with an aromatic amine-base developing agent remaining after color development to produce a chemically inactive and substantially colorless compound and/or Compound (G) which reacts with an oxidation product of an aromatic amine-base developing agent remaining after color development to produce a chemically inactive and substantially colorless compound are preferably used simultaneously or individually for preventing generation of stains or other side reaction due to a colored dye produced by the reaction of color developing agent or oxidation product thereof remaining in the layer with a coupler during storage after the processing.

The silver halide emulsion layer or the interlayer of the light-sensitive material for use in the present invention may contain a hydroquinone derivative, an aminophenol derivative, a gallic acid derivative or an ascorbic acid derivative as an antifoggant or a color mixing inhibitor. Among these compounds, preferred are those which hardly generate stains even upon heating at from 160 to 200° C.

In order to prevent deterioration of the cyan dye image due to heat and, in particular, light, it is more effective to incorporate an ultraviolet absorbent into the cyan coloring layer and both layers adjacent thereto.

Examples of the ultraviolet absorbent include benzotriazole compounds substituted with an aryl group (for example, those described in U.S. Pat. No. 3,533,794), 4-thiazolidone compounds (for example, those described in U.S. Pat. Nos. 3,314,794 and 3,352,681), benzophenone compounds (for example, those described in JP-A-46-2784), cinnamic ester compounds (for example, those described in U.S. Pat. Nos. 3,705,805 and 3,707,395), butadiene compounds (for example, those described in U.S. Pat. No. 4,045,229) and benzoxazole compounds (for example, those described in U.S. Pat. Nos. 3,406,070 and 4,271,307). An ultraviolet light absorbing coupler (e.g., $\alpha$-naphthol-base cyan dye forming coupler) or an ultraviolet absorbing polymer may also be used. The ultraviolet absorbent may be mordanted to a specific layer. Among these, the benzotriazole compound substituted by an aryl group is preferred.

To the light-sensitive material for use in the present invention, an antiseptic or an antifungal as described in JP-A-63-271247 is preferably added so as to prevent various molds and bacteria from proliferation in the hydrophilic colloid layer to deteriorate the image.

Gelatin is advantageous as the binder or protective colloid which can be used in the silver halide emulsion layer, the interlayer or the protective layer of the light-sensitive material of the present invention, however, other hydrophilic polymers may be used. Examples of the hydrophilic polymer include polyvinyl alcohol, polyvinyl alcohol partial acetal, polyvinyl butyral, poly-N-vinylpyrrolidone, polyacrylic acid, polyacrylamide, polyvinylimidazole, polyvinylpyrazole, carrageenan, gum arabi and a homopolymer or copolymer of cellulose derivatives such as hydroxyalkyl cellulose, carboxymethyl cellulose, cellulose sulfate, cellulose acetate hydrogen phthalate or sodium alginate.

Also, a graft polymer of gelatin with other polymer may be used and examples of the gelatin graft polymer include those obtained by grafting an acrylic acid, a methacrylic acid, a derivative such as ester or amide of the acrylic acid or methacrylic acid, or a homopolymer or copolymer of vinyl-base monomers such as acrylonitrile or styrene, to gelatin. In particular, graft polymers to a polymer having somewhat compatibility with gelatin, such as a polymer of acrylic acid, methacrylic acid, acrylamide, methacrylamide or hydroxyalkyl methacrylate, are preferred. Examples thereof ae described in U.S. Pat. Nos. 2,763,625, 2,831,767 and 2,956,884, and JP-A-56-65133.

Representative examples of the synthetic hydrophilic polymer material which can be used are described in West German Patent Publication (OLS) No. 2,312,708, U.S. Pat. Nos. 3,620,751 and 3,879,205, and JP-B-43-7561.

The above-described hydrophilic polymers may be used either individually or in combination of two or more thereof.

The gelatin may be an alkali-processed gelatin, an acid-processed gelatin, an enzyme-processed gelatin or a mixture of these. Further, gelatin derivatives obtained by reacting various compounds such as an acid halide, an acid anhydride, an isocyanate, a bromoacetic acid, an alkanesultone acid, a vinylsulfonamide, a maleinimide compound, a polyalkyleneoxide or an epoxy compound, with gelatin may also be used. Specific examples of the gelatin derivative are described in U.S. Pat. Nos. 2,614,928, 3,132,945, 3,186,846 and 3,312,553, British Patents 861,414, 1,033,189 and 1,005,784, and JP-B-42-26845.

The total binder amount in the light-sensitive material for use in the present invention is preferably from 3 to 10 g/m$^2$, more preferably from 3.5 to 7 g/m$^2$, because the thickness of the color filter layer needs be reduced as much as possible. The amount of binder in each silver halide emulsion layer is preferably from 0.3 to 3 g/m$^2$, more preferably from 0.35 to 2.0 g/m$^2$. The amount of binder in each interlayer or protective layer is preferably from 0.1 to 1.5 g/m$^2$, more preferably from 0.2 to 1.0 g/m$^2$.

In the case where a release layer or a back layer is provided in the light-sensitive material, the binder in these layers does not have any direct relation to the constituent components of the color filter and therefore, is not counted in the above-described "total binder amount".

The support for use in the present invention is preferably a light-transmitting substrate, however, as described in JP-A-7-244212, silver halide emulsion layers provided on a separate support may be transferred and firmly bonded onto a light-transmitting substrate to prepare a light-sensitive material for the color filter. In this case, the support is not necessarily required to be light-transmitting and for example, a support having coated on the back surface thereof carbon black may be used.

The material constituting the light-transmitting substrate preferably has an optically isotropic property and excellent heat resistance, and examples thereof include polyethylene terephthalate, polybutylene terephthalate, polyethylene naphthalate polystyrene, polycarbonate, polyether sulfone, cellulose acetate, polyarylate, soda glass, borosilicate glass and quartz.

The surface of the substrate constituted by the above-described material may be subjected to undercoating treatment, if desired. Further, the surface may be subjected to glow discharge, corona discharge or ultraviolet (UV) irradiation treatment.

The light-transmitting substrate may be used in the form of a plate, a sheet or a film. The thickness of the substrate may be appropriately selected depending upon the use and the construction material, however, it is commonly from 0.01 to 10 mm. For example, in the case of a glass substrate, the thickness is from 0.3 to 3 mm.

Examples of the silver halide light-sensitive material for use in the present invention includes a usual negative or positive color photographic light-sensitive material having such a structure that the blue-sensitive emulsion layer contains a yellow coupler, the green-sensitive emulsion layer contains a magenta coupler and the red sensitive emulsion layer contains a cyan coupler, and in addition, the light-sensitive materials described in JP-A-55-6342, JP-A-62-148952, JP-A-62-71950, JP-A-B-136722 and JP-A-7-244212.

The light-sensitive material for use in the present invention is subjected to color development by usual methods described in *RD,* No. 17643, pp. 28–29 and ibid., No. 18716, p. 651, left to right columns, to obtain a micro color filter.

For example, the light-sensitive material is subjected to color development, desilvering and water washing. In the desilvering process, bleach-fixing processing using a bleach-fixing solution may be performed in place of bleaching using a bleaching solution and fixing using a fixing solution, or bleaching, fixing and bleach-fixing may be used in combination in any order. Stabilization may be performed in place of water washing, or stabilization may be performed after water washing. Further, mono-bath processing using a mono-bath developing-bleaching-fixing processing solution capable of conducting color development, bleaching and fixing in one bath may also be performed. In combination with these processing steps, pre-hardening processing, neutralization processing therefor, stop-fixing processing, after-hardening processing, regulating processing or intensification processing may be performed. Particularly, performing after-hardening processing prior to formation of the protective film on the color filter is preferred to enhance the adhesion between the color filter layer and the protective film, to thereby prevent the generation of crack during storage under a high humidity condition. In these processings, activator processing may be performed in place of color development processing.

Furthermore, as described in JP-A-7-159610, color development and desilvering may be performed using an internal latent image-type autopositive emulsion in combination with a nucleating agent or light fogging.

With respect to the developing apparatus, in the case of a flexible support (substrate), a developing machine used in usual photographic processing may be used. In the case of a hard support such as glass, a developing machine for glass dry plate or a developing apparatus described in JP-A-7-56015 may be used.

The exposure method which can be applied to the present invention includes a face exposure method through a mask and a scanning exposure method. The scanning method includes a line (slit) scanning method and a point scanning method using laser exposure.

The light source includes a tungsten lamp, a halogen lamp, a fluorescent lamp (e.g., three wavelength-type fluorescent lamp), a mercury lamp, a laser light and a light emitting diode. Among these, a halogen lamp, a fluorescent lamp and a laser light are preferred.

Another example of the exposure method which can be applied to the present invention is a method where, as described in JP-A-8-201616, a liquid display panel into which the color filter prepared according to the present invention is to be integrated is used and exposed in combination with a color filter three times in sequence.

On the color filter produced according to the method of the present invention, a transparent electrode (ITO) may. be provided by evaporation coating, for example, vacuum evaporation or sputtering.

Further thereon, an orientating layer of polyimide resin or the like may be provided.

Furthermore, a deflecting plate or a plate difference film may be provided on the surface opposite the emulsion surface side of the light-transmitting substrate of the color filter.

In place of the glass plate, a plastic film substrate having provided thereon a gas barrier layer or a hard coat layer may be used as the light-transmitting substrate.

The color LCD and the production method thereof are described in detail in Shoichi Matsumoto and Ichiryo Tsunoda, *Ekisho no Kiso to Oyo* (*Basic Study and Application of Liquid Crystal*), issued by Kogyo Chosa Kai (1991), *Flat Panel Display,* 1994, compiled by Nikkei Microdevice, issued by Nikkei BP Sha (1993) and JP-A-1-114820.

The present invention will be described in detail with reference to the following Examples, but the invention should not-be construed as being limited thereto.

EXAMPLE 1

The preparation of Light-Sensitive Silver Halide Emulsion (I) is described below.

To a well stirred aqueous gelatin solution having a composition shown in Table 1, Solution (I) shown in Table 2 was added over 1 minute. Twenty seconds after initiation of the addition of Solution (I), Solution (II) was added over 40 seconds, and after 2 minutes, Solutions (III) and (IV) were added simultaneously over 4 minutes.

TABLE 1

| Composition of Aqueous Gelatin Solution | |
|---|---|
| $H_2O$ | 650 ml |
| Lime-processed gelatin | 20 g |
| NaCl | 3 g |
| Silver Halide Solvent (1) | 0.015 g |
| Temperature | 40° C. |

TABLE 2

| | Solution (I) | Solution (II) | Solution (III) | Solution (IV) |
|---|---|---|---|---|
| $AgNO_3$ | 20 g | | 80 g | |
| NaCl | | 4.91 g | | 29.5 g |
| Total | $H_2O$ added to make 120 ml | $H_2O$ added to make 85.7 ml | $H_2O$ added to make 480 ml | $H_2O$ added to make 514 ml |

Silver Halide Solvent (1)

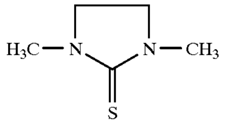

The mixture was washed with water and desalted (conducted using Precipitant (a) at a pH of 4.0) according to a usual method, and then 22 g of delimed gelatin was added and dispersed. After adjusting the pH to 6.0, 4 ml of a 10% aqueous solution of sodium chloride was added and further, 70 mg of Antiseptic (1) was added to obtain a silver chloride emulsion having a grain size of 0.15 μm. The yield of the emulsion was 630 g.

Precipitant (a)

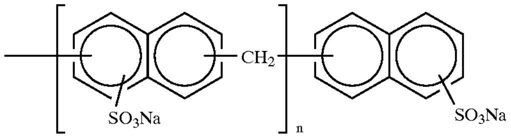

n = 3 ~ 4

Antiseptic (1)

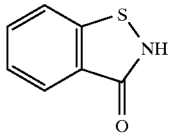

The preparation of Silver Halide Emulsion (II) is described below.

A silver chlorobromide emulsion having a silver chloride content of 70 mol % was prepared in the same manner as Silver Halide Emulsion (I) except for changing the composition of the aqueous gelatin solution, and Solutions (I) and (II) as shown in Tables 3 and 4. The grain size was 0.18 μm.

TABLE 3

| Composition of Aqueous Gelatin Solution | |
|---|---|
| $H_2O$ | 650 ml |
| Lime-processed gelatin | 20 g |
| NaCl | 3 g |
| KBr | 0.3 g |
| Silver Halide Solvent (1) | 0.015 g |
| Temperature | 40° C. |

TABLE 4

| | Solution (I) | Solution (II) | Solution (III) | Solution (IV) |
|---|---|---|---|---|
| $AgNO_3$ | 20 g | | 80 g | |
| NaCl | | 3.46 g | | 20.7 g |

TABLE 4-continued

| | Solution (I) | Solution (II) | Solution (III) | Solution (IV) |
|---|---|---|---|---|
| KBr | | 3.0 g | | 18.0 g |
| Total | $H_2O$ added to make 120 ml | $H_2O$ added to make 85.7 ml | $H_2O$ added to make 480 ml | $H_2O$ added to make 514 ml |

One surface of an optically isotropic polyarylate substrate having a thickness of 80 μm was subjected to corona discharge treatment, and an SBR latex layer and a gelatin layer were provided to achieve good adhesion to the photographic emulsion layer. On the thus-prepared support, the following first to tenth layers were provided by a multiple-layer simultaneous coating method to prepare Color Light-Sensitive Material 1A. The components and the coating amounts (unit: $g/m^2$) are shown below. With respect to the silver halide and colloidal silver emulsion, the coating amount is calculated in terms of silver.

| | |
|---|---|
| First Layer (antihalation layer): | |
| Gelatin | 0.70 |
| Colloidal silver emulsion (average grain size: 0.02 μm) | 0.20 |
| Hardener (H-1) | 0.06 |
| Second Layer (interlayer): | |
| Gelatin | 0.50 |
| Third Layer (infrared-sensitive layer): | |
| Silver Halide Emulsion (I) spectrally sensitized by Infrared Sensitizing Dye (ExS-6) | 0.28 |
| Antifoggant (Cpd-12) | 0.005 |
| Gelatin | 0.57 |
| Cyan Coupler (ExC-2) | 0.10 |
| Magenta Coupler (ExM-1) | 0.14 |
| Yellow Coupler (ExY-1) | 0.35 |
| Discoloration Inhibitor (Cpd-3) | 0.05 |
| Discoloration Inhibitor (Cpd-4) | 0.005 |
| Discoloration Inhibitor (Cpd-5) | 0.02 |
| Ultraviolet Absorbent (Cpd-6) | 0.005 |
| Ultraviolet Absorbent (Cpd-7) | 0.01 |
| Stain Inhibitor (Cpd-13) | 0.01 |
| High Boiling Point Solvent (Solv-1) | 0.32 |
| High Boiling Point Solvent (Solv-2) | 0.07 |
| High Boiling Point Solvent (Solv-4) | 0.13 |
| Polymer (Cpd-14) | 0.01 |
| Fourth Layer (interlayer): | |
| Gelatin | 0.38 |
| Color Mixing Inhibitor (Cpd-2) | 0.02 |
| Color Mixing Inhibitor (Cpd-10) | 0.09 |
| High Boiling Point Solvent (Solv-1) | 0.03 |
| High Boiling Point Solvent (Solv-3) | 0.01 |
| Ultraviolet Absorbent (Cpd-8) | 0.02 |
| Ultraviolet Absorbent (Cpd-7) | 0.02 |
| Ultraviolet Absorbent (Cpd-6) | 0.01 |
| Ultraviolet Absorbent (Cpd-9) | 0.02 |
| Stain Inhibitor (Cpd-11) | 0.04 |
| Irradiation Preventive Dye (Dye-1) | 0.03 |
| Irradiation Preventive Dye (Dye-2) | 0.02 |
| Fifth Layer (red-sensitive Layer): | |
| Silver Halide Emulsion (I) spectrally sensitized by Red Sensitizing Dyes (ExS-4 and ExS-5) | 0.28 |
| Gelatin | 0.65 |
| Yellow Coupler (ExY-1) | 0.53 |
| Magenta Coupler (ExM-1) | 0.29 |
| Discoloration Inhibitor (Cpd-3) | 0.06 |

-continued

| | |
|---|---|
| Discoloration Inhibitor (Cpd-4) | 0.005 |
| Discoloration Inhibitor (Cpd-5) | 0.01 |
| Stain Inhibitor (Cpd-13) | 0.01 |
| Polymer (Cpd-14) | 0.02 |
| High Boiling Point Solvent (Solv-1) | 0.32 |
| High Boiling Point Solvent (Solv-2) | 0.08 |
| High Boiling Point Solvent (Solv-4) | 0.20 |
| Sixth Layer (interlayer): | |
| Gelatin | 0.38 |
| Color Mixing Inhibitor (Cpd-2) | 0.02 |
| Color Mixing Inhibitor (Cpd-10) | 0.09 |
| High Boiling Point Solvent (Solv-1) | 0.03 |
| High Boiling Point Solvent (Solv-3) | 0.01 |
| Ultraviolet Absorbent (Cpd-8) | 0.02 |
| Ultraviolet Absorbent (Cpd-7) | 0.02 |
| Ultraviolet Absorbent (Cpd-6) | 0.01 |
| Ultraviolet Absorbent (Cpd-9) | 0.02 |
| Stain Inhibitor (Cpd-11) | 0.04 |
| Irradiation Preventive Dye (Dye-1) | 0.03 |
| Irradiation Preventive Dye (Dye-2) | 0.02 |
| Seventh Layer (green-sensitive layer): | |
| Silver Halide Emulsion (I) spectrally sensitized by Green Sensitizing Dye (ExS-3) | 0.35 |
| Gelatin | 0.61 |
| Cyan Coupler (ExC-1) | 0.33 |
| Yellow Coupler (ExY-1) | 0.42 |
| Discoloration Inhibitor (Cpd-5) | 0.01 |
| Ultraviolet Absorbent (Cpd-6) | 0.03 |
| Ultraviolet Absorbent (Cpd-7) | 0.06 |
| Stain Inhibitor (Cpd-13) | 0.02 |
| High Boiling Point Solvent (Solv-1) | 0.16 |
| High Boiling Point Solvent (Solv-2) | 0.21 |
| Polymer (Cpd-14) | 0.02 |
| Eighth Layer (interlayer): | |
| Gelatin | 0.38 |
| Color Mixing Inhibitor (Cpd-2) | 0.02 |
| Color Mixing Inhibitor (Cpd-10) | 0.09 |
| High Boiling Point Solvent (Solv-1) | 0.03 |
| High Boiling Point Solvent (Solv-3) | 0.01 |
| Ultraviolet Absorbent (Cpd-8) | 0.02 |
| Ultraviolet Absorbent (Cpd-7) | 0.02 |
| Ultraviolet Absorbent (Cpd-6) | 0.01 |
| Ultraviolet Absorbent (Cpd-9) | 0.02 |
| Stain Inhibitor (Cpd-11) | 0.04 |
| Yellow Dye (YF-1) | 0.17 |
| Ninth Layer (blue-sensitive layer): | |
| Silver Halide Emulsion (II) spectrally sensitized by Blue Sensitizing Dyes (ExS-1 and ExS-2) | 0.27 |
| Antifoggant (Cpd-2) | 0.01 |
| Gelatin | 0.48 |
| Cyan Coupler (ExC-2) | 0.51 |
| Magenta Coupler (ExM-1) | 0.04 |
| Discoloration Inhibitor (Cpd-3) | 0.01 |
| Discoloration Inhibitor (Cpd-4) | 0.001 |
| Discoloration Inhibitor (Cpd-5) | 0.002 |
| Ultraviolet Absorbent (Cpd-6) | 0.03 |
| Ultraviolet Absorbent (Cpd-7) | 0.08 |
| High Boiling Point Solvent (Solv-1) | 0.25 |
| High Boiling Point Solvent (Solv-2) | 0.02 |
| Tenth Layer (protective layer): | |
| Gelatin (acid-processed) | 0.31 |
| Antistatic agent (Cpd-1) | 0.03 |

In each layer, sodium dodecylbenzenesulfonate as an emulsification dispersion aid, ethyl acetate as an auxiliary solvent, Surface Active Agent (Cpd-17) as a coating aid and potassium polystyrenesulfonate as a thickening agent were used.

ExC-1
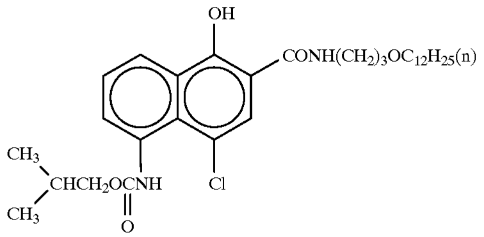
ExM-1
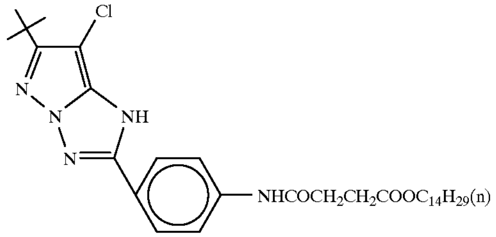
ExY-1
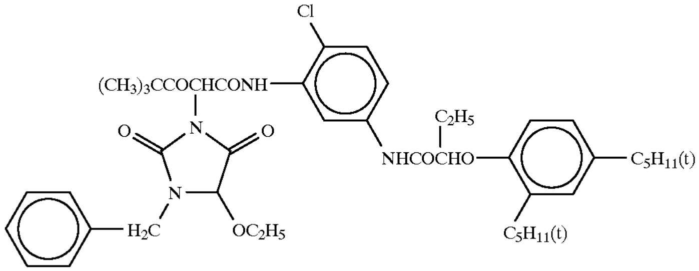
ExS-1
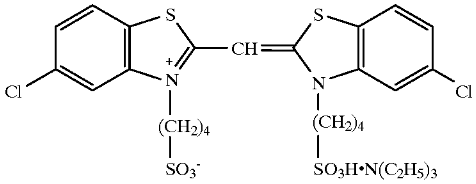
ExS-2
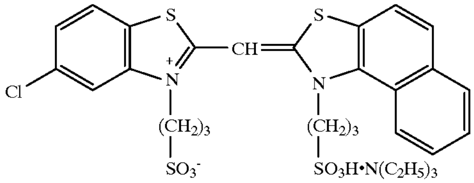
ExS-3
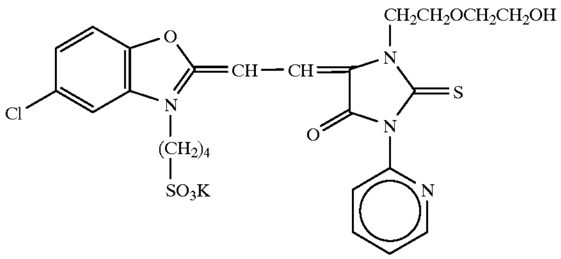

-continued
ExS-4
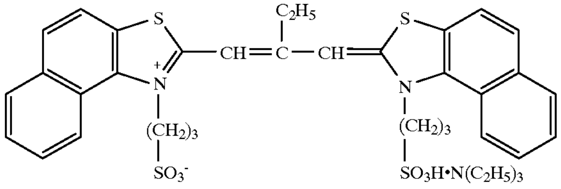
ExS-5
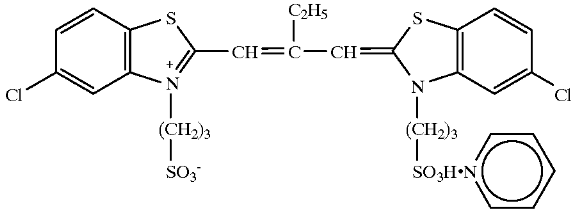
ExS-6
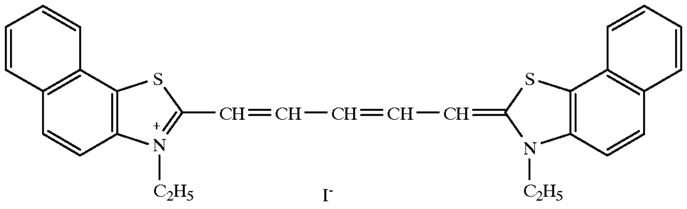
ExC-2
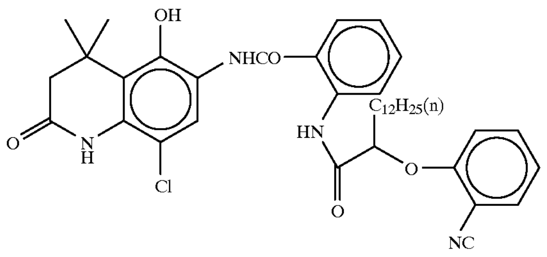
ExM-2
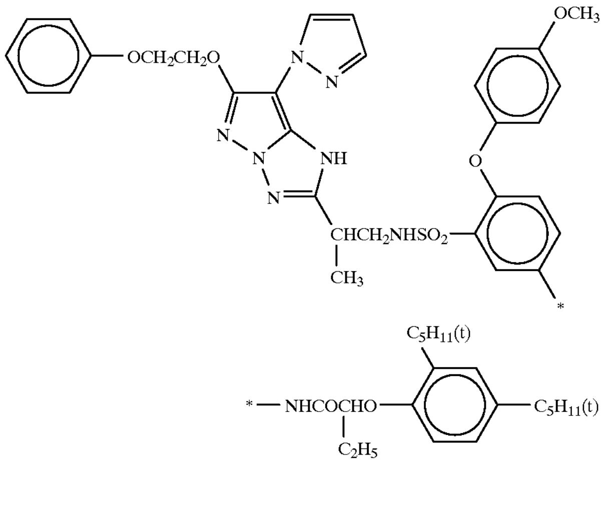

-continued
ExY-2
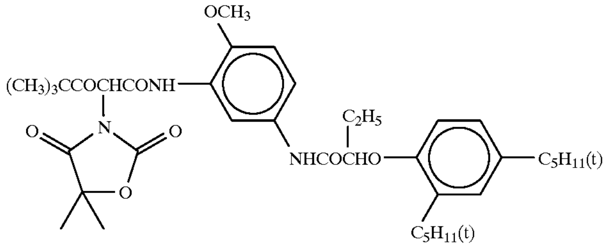
Cpd-1
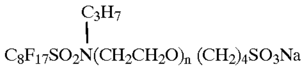
n = 4.5
Cpd-2
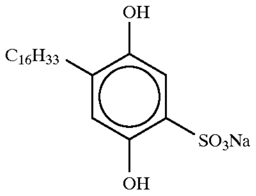
Cpd-3
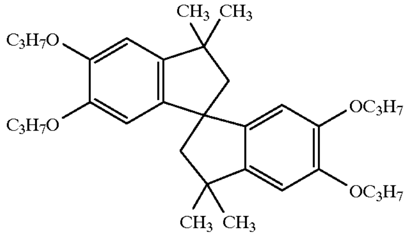
Cpd-4
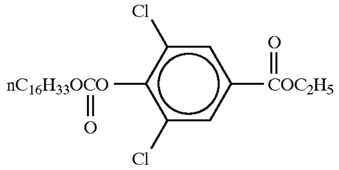
Cpd-5
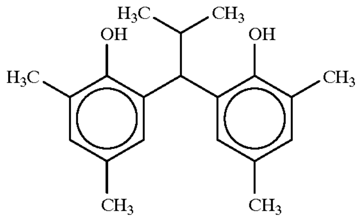
Cpd-6
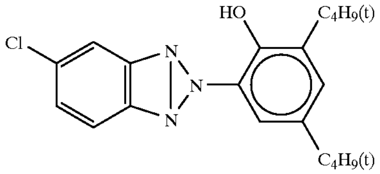

-continued
Cpd-7
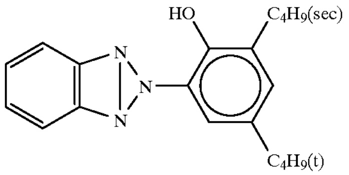
Cpd-8
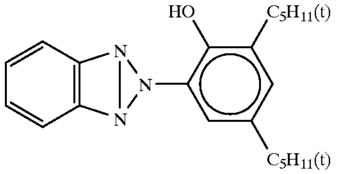
Cpd-9
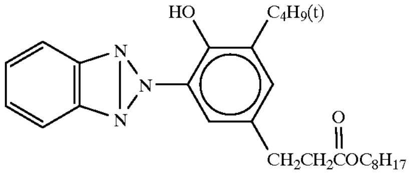
Cpd-10
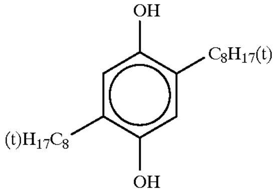
Cpd-11
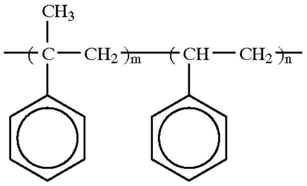
m/n = 9/1
Cpd-12
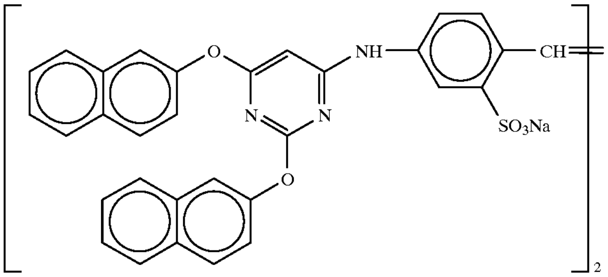
Cpd-13
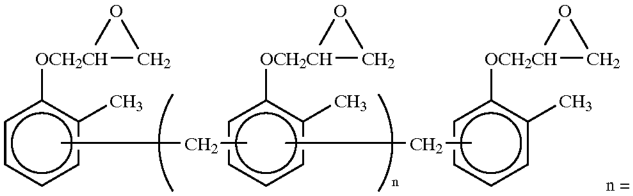
n = 7 ~ 8
Cpd-14
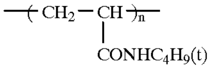
n = 100 ~ 1000

-continued
Cpd-15
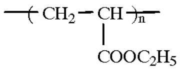
n = 100 ~ 1000
Cpd-16
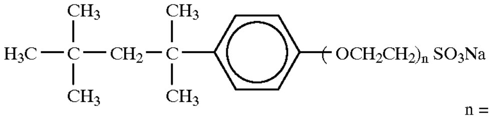
n = 3
Cpd-17
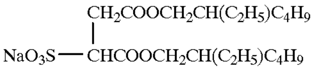
Solv-1
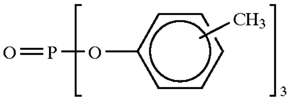
Solv-2
$P{=}O{-}O{-}(C_8H_{17}(EH))_3$
Solv-3
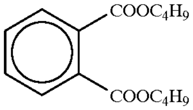
Solv-4
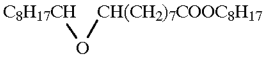
YF-1
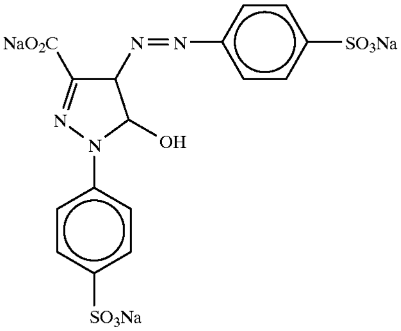
Dye-1
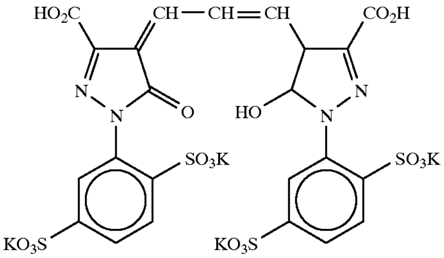
Dye-2
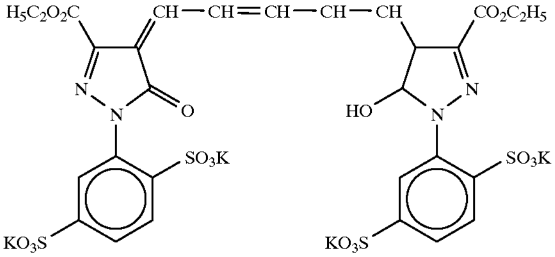

-continued

H-1

$CH_2{=}CHSO_2CH_2SO_2CH{=}CH_2$

Antihalation dye

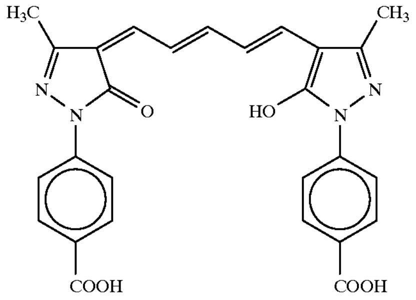

On the thus-prepared color light-sensitive material, the respective mask filter shown in FIG. 1 and a color filter corresponds to the respective spectral sensitivities of the light-sensitive material were superposed, and then the light-sensitive material was exposed to tungsten light four times in sequence. The exposed light-sensitive material was color developed through the following processing steps to form B, G and R three colors and black, and then after-hardened to prepare Color Filter 1A.

| Processing Step | Temperature (° C.) | Time |
|---|---|---|
| Color development | 38 | 80 sec. |
| Bleach-fixing | 38 | 90 sec. |
| Water washing-1 | 35 | 80 sec. |
| After-hardening | 38 | 5 min. |
| Water washing-2 | 35 | 40 sec. |
| Water washing-3 | 35 | 40 sec. |
| Drying | 60 | 2 min. |

Each processing solution had the following composition.

| | |
|---|---|
| Color Developer: | |
| Water | 800 ml |
| Ethylenediaminetetraacetic acid | 3.0 g |
| Disodium 4,5-dihydroxybenzene-1,3-disulfonate | 0.5 g |
| Triethanolamine | 12.0 g |
| Potassium chloride | 6.5 g |
| Potassium bromide | 0.03 g |
| Potassium carbonate | 27.0 g |
| Sodium sulfite | 0.1 g |
| Disodium N,N-bis(sulfonatoethyl)-hydroxylamine | 5.0 g |
| Sodium triisopropylnaphthalene(β)-sulfonate | 0.1 g |
| N-Ethyl-N-(β-methanesulfonamidoethyl)-3-methyl-4-aminoaniline 3/2 sulfate monohydrate | 5.0 g |
| Water to make | 1 l |
| pH (25° C.) | 10.0 |
| Bleach-Fixing Solution: | |
| Water | 600 ml |
| Ammonium thiosulfate (750 g/l) | 93 ml |
| Ammonium sulfite | 40.0 g |
| Ammonium ethylenediaminetetraacetato ferrate | 55.0 g |
| Ethylenediaminetetraacetic acid | 5.0 g |
| Nitric acid (67%) | 30.0 g |
| Water to make | 1 l |
| pH (25° C.) | 5.8 |

-continued

| |
|---|
| Washing Water: |
| Deionized water having an electric conductivity of 5 μS or less |

After-Hardening Solution:

Aqueous solution containing 10% of glutaraldehyde.

Color Filter 1A obtained through the processing above had RGB free of color turbidity and excellent in spectral transmission characteristics as well as black stripes in high density, and exhibited a swelling ratio with water at 40° C. of 150%.

On the thus-prepared Color Filter 1A, a solution (hardening composition) having the following composition was coated and hardened to form Protective Film 1C, thus, Sample 1S was prepared.

In the coating and hardening, the hardening composition was coated so that the protective film after the auxiliary solvent was dried, could have a thickness of 2 μm, and hardened by heat-treating the composition in a constant temperature bath at 120° C. for 30 minutes and further in a constant temperature bath at 150° C. for 30 minutes.

| Hardening Composition | |
|---|---|
| Cresol novolak-type epoxy resin (EOCN-104S, produced by Nippon Kayaku KK) | 25 g |
| Trimellitic anhydride | 5 g |
| Cellosolve acetate | 70 g |

The thus-prepared Sample 1S was subjected to a cross-cut adhesion test (according to JIS-K-5400) by tape peeling to examine the adhesion between the protective film and the color filter. As a result, peeling of the protective film was not observed at all.

In order to examine the wet heat stability of Sample 1A, the sample was placed in an air-conditioned tank at a temperature of 60° C. and a humidity of 95% for 72 hours and then the surface thereof was observed through an optical microscope at a temperature of 25° C. and a humidity of 50%. As a result, wrinkles and cracks were not observed at all.

EXAMPLE 2

The same color light-sensitive material prepared in Example 1 was exposed in the same manner as in Example 1 and subjected to the processing up to Water Washing 1 to form B, G and R three colors and black color, and then subjected to after-hardening treatment with using After-Hardening Processing Solution 1B, 2B, 3B, 4B, 5B, 6B or 7B shown in Table 5 in place of the after-hardening processing solution used in Example 1. Thus, Color Filters 2A to 7A were prepared. These filters each was determined on the swelling ratio. Thereafter, Protective Film 1C, 2C or 3C was applied on the color filters in the same manner as in Example 1 to prepare Samples 2S to 9S. Samples 2S to 9S were subjected to the cross-cut test and the wet heat stability test, and the results obtained are shown in Table 7 together with the swelling ratio of Color Filters 2A to 6A. As a comparative example, Sample 10S was prepared by providing Protective Film 1C on a color filter which was not passed through the after-hardening treatment, and then subjected to the same tests.

TABLE 5

| Hardening Processing Solution | Hardener (concentration: wt %) |
|---|---|
| 1B | glutaraldehyde (10%) |
| 2B | glutaraldehyde (5%) |
| 3B | glutaraldehyde (3%) |
| 4B | glutaraldehyde (30%) |
| 5B | succinaldehyde (10%) |
| 6B | formalin (10%) |
| 7B | formalin (3%) |

TABLE 6

| Protective Film | Hardening Composition | | Hardening Method |
|---|---|---|---|
| 1C | cresol novolak-type epoxy resin (EOCN-104S, produced by Nippon Kayaku KK) | 25 g | heating(*) |
| | trimellitic anhydride | 5 g | |
| | cellosolve acetate | 70 g | |
| 2C | bisphenol A-type epoxy resin (Epicote 808, produced by Yuka Shell Epoxy) | 25 g | heating(*) |
| | trimellitic anhydride | 5 g | |
| | cellosolve acetate | 70 g | |
| 3C | cresol novolak-type epoxy resin (EOCN-104S, produced by Nippon Kayaku KK) | 25 g | UV irradiation(**) |
| | aromatic sulfonium salt-base UV initiator (Cyracure UV1-6974 ™, produced by Uniform Carbide) | 2.5 g | |
| | methyl ethyl ketone | 72.5 g | |

Note:
heating(*): Heat treatment in a constant temperature tank at 120° C. for 30 minutes, then in a constant temperature tank at 150° C. for 30 minutes.
UV irradiation(**): Heat treatment in a constant temperature tank at 90° C. for 10 minutes, then UV irradiation under a high-pressure mercury lamp of 160 W from a distance of 10 cm for 1.5 seconds.

TABLE 7

| Sample | After-Hardening Processing Solution | Protective Film | Swelling Ratio (%) | Results of Cross-Cut Test(*) | Results of Wet Heat Stability Test(**) |
|---|---|---|---|---|---|
| 1S | 1B | 1C | 150 | ○ | ○ |
| 2S | 2B | 1C | 180 | ○ | ○ |
| 3S | 3B | 1C | 200 | ○ | Δ |
| 4S | 4B | 1C | 120 | ○ | ○ |
| 5S | 5B | 1C | 170 | ○ | ○ |
| 6S | 6B | 1C | 170 | ○ | ○ |
| 7S | 7B | 1C | 200 | ○ | Δ |
| 8S | 1B | 2C | 155 | ○ | ○ |

TABLE 7-continued

| Sample | After-Hardening Processing Solution | Protective Film | Swelling Ratio (%) | Results of Cross-Cut Test(*) | Results of Wet Heat Stability Test(**) |
|---|---|---|---|---|---|
| 9S | 1B | 3C | 170 | ○ | ○ |
| 10S | no after-hardening | 1C | 250 | ○ | x |

Note:
Cross-Cut Test(*): According to JIS-K-5400
○: No peeling of the protective film
Wet Heat Stability Test(**):
Each sample was placed in an air conditioned tank at 60° C. and 90% for 72 hours, and then the surface thereof was observed through an optical microscope. ○: No change, Δ: Wrinkles were partly observed, x: Wrinkles and cracks were observed.

In the case of Samples 1S to 9S which were subjected to after-hardening treatment, even if each sample was placed in an environment of a temperature of 60° C. and a humidity of 95% for 72 hours, almost no wrinkle was generated on the surface thereof, which reveals that the stability under high humidity can be improved when the sample is subjected to after-hardening treatment to reduce the swelling ratio of the color filter layer to 200% or less and then a protective layer is applied thereon.

EXAMPLE 3

Color Filter 11A was prepared using the second and higher emulsion layers of the color light-sensitive material described in Example 1 of JP-A-8-136722 (corresponds to EP 713137A) according to the method described in the patent publication. The swelling ratio with water at 40° C. of Color Filter 11A was 210%. On Color Filter 11A, Protective Film 1C was applied to prepare Sample 11S.

Color Filter 11A was subjected to after-hardening and subsequent processings in Example 1 of the present invention. The swelling ratio with water at 40° C. measured was 150%. Thereafter, Protective Film 1C was applied thereon to prepare Sample 12S.

The thus-prepared Samples 11S and 12S each was subjected to the cross-cut test by tape peeling to examine the adhesion between the protective film and the color filter. As a result, peeling of the protective film was not observed at all both in Samples 11S and 12S.

Then, Samples 11s and 12 S each was subjected to the wet heat stability test. As a result thereof, in Sample 11S, wrinkles were observed on the surface of the protective film, whereas in Sample 12S, wrinkled and cracks were not observed at all.

It is seen from these results that, similarly to Example 1, when a protective film is provided after applying after-hardening treatment to the color filter to reduce the swelling ratio with water at 40° C. of the color filter layer to 200% or less, the stability under high humidity conditions can be improved.

EXAMPLE 4

A hard coat layer was provided on one surface of an optically isotropic polyarylate substrate having a thickness of 100 $\mu$m. The opposite surface was subjected to corona discharge treatment, and two layers of SBR latex layer and gelatin layer were provided to achieve good adhesion to the photographic emulsion layer. Further thereon, the following first to ninth layers were provided by a multi-layer simultaneous coating method to prepare a color light-sensitive material. The components and the coating amounts (unit: g/m$^2$) are shown below. With respect to the silver halide, the coating amount is calculated in terms of silver.

| | |
|---|---|
| First Layer (antihalation layer): | |
| Gelatin | 0.70 |
| Antihalation dye (fine particle dispersion) | 0.17 |
| Carboxymethyl cellulose | 0.05 |
| Surface active agent (Cpd-16) | 0.03 |
| Hardener (H-1) | 0.12 |
| Second Layer (infrared-sensitive layer): | |
| Silver halide emulsion spectrally sensitized by Infrared Sensitizing Dye (ExS-6) ($AgBr_{30}Cl_{70}$; average grain size: 0.2 $\mu$m) | 0.28 |
| Stabilizer (Cpd-12) | 0.005 |
| Gelatin | 0.57 |
| Cyan Coupler (ExC-2) | 0.10 |
| Yellow Coupler (ExY-1) | 0.35 |
| Magenta Coupler (ExM-1) | 0.14 |
| Discoloration Inhibitor (Cpd-3) | 0.05 |
| Discoloration Inhibitor (Cpd-4) | 0.005 |
| Discoloration Inhibitor (Cpd-5) | 0.02 |
| High Boiling Point Solvent (Solv-1) | 0.42 |
| High Boiling Point Solvent (Solv-2) | 0.10 |
| Stain Inhibitor (Cpd-13) | 0.01 |
| Polymer (Cpd-14) | 0.01 |
| Third Layer (interlayer): | |
| Gelatin | 0.38 |
| Color Mixing Inhibitor (Cpd-2) | 0.02 |
| Color Mixing Inhibitor (Cpd-10) | 0.09 |
| High Boiling Point Solvent (Solv-1) | 0.03 |
| High Boiling Point Solvent (Solv-3) | 0.01 |
| Ultraviolet Absorbent (Cpd-8) | 0.02 |
| Ultraviolet Absorbent (Cpd-7) | 0.02 |
| Ultraviolet Absorbent (Cpd-6) | 0.01 |
| Ultraviolet Absorbent (Cpd-9) | 0.02 |
| Stain Inhibitor (Cpd-11) | 0.04 |
| Fourth Layer (red-sensitive Layer): | |
| Silver halide emulsion spectrally sensitized by Red Sensitizing Dyes (ExS-4 and ExS-5) (AgCl; average grain size: 0.18 $\mu$m) | 0.31 |
| Gelatin | 0.77 |
| Yellow Coupler (ExY-1) | 0.53 |
| Magenta Coupler (ExM-2) | 0.29 |
| Discoloration Inhibitor (Cpd-3) | 0.06 |
| Discoloration Inhibitor (Cpd-4) | 0.005 |
| Discoloration Inhibitor (Cpd-5) | 0.01 |
| High Boiling Point Solvent (Solv-1) | 0.48 |
| High Boiling Point Solvent (Solv-2) | 0.12 |
| Polymer (Cpd-14) | 0.03 |
| Fifth Layer (interlayer): | |
| Gelatin | 0.38 |
| Color Mixing Inhibitor (Cpd-2) | 0.02 |
| Color Mixing Inhibitor (Cpd-10) | 0.09 |
| High Boiling Point Solvent (Solv-1) | 0.03 |
| High Boiling Point Solvent (Solv-3) | 0.01 |
| Ultraviolet Absorbent (Cpd-8) | 0.02 |
| Ultraviolet Absorbent (Cpd-7) | 0.02 |
| Ultraviolet Absorbent (Cpd-6) | 0.01 |
| Ultraviolet Absorbent (Cpd-9) | 0.02 |
| Stain Inhibitor (Cpd-11) | 0.04 |
| Irradiation Preventive Dye (Dye-1) | 0.005 |
| Irradiation Preventive Dye (Dye-2) | 0.02 |
| Sixth Layer (green-sensitive layer): | |
| Silver halide emulsion spectrally sensitized by Green Sensitizing Dye (ExS-3) (AgCl; average grain size: 0.18 $\mu$m) | 0.43 |
| Gelatin | 1.09 |
| Cyan Coupler (ExC-1) | 0.33 |
| Yellow Coupler (ExY-1) | 0.43 |
| Discoloration Inhibitor (Cpd-5) | 0.01 |

-continued

| | |
|---|---|
| Stain Inhibitor (Cpd-13) | 0.01 |
| High Boiling Point Solvent (Solv-1) | 0.08 |
| High Boiling Point Solvent (Solv-2) | 0.11 |
| Polymer (Cpd-14) | 0.03 |
| Seventh Layer (interlayer): | |
| Gelatin | 0.38 |
| Color Mixing Inhibitor (Cpd-2) | 0.02 |
| Color Mixing Inhibitor (Cpd-10) | 0.09 |
| High Boiling Point Solvent (Solv-1) | 0.03 |
| High Boiling Point Solvent (Solv-3) | 0.01 |
| Ultraviolet Absorbent (Cpd-8) | 0.02 |
| Ultraviolet Absorbent (Cpd-7) | 0.02 |
| Ultraviolet Absorbent (Cpd-6) | 0.01 |
| Ultraviolet Absorbent (Cpd-9) | 0.02 |
| Stain Inhibitor (Cpd-11) | 0.04 |
| Yellow Dye (YF-1) | 0.17 |
| Eighth Layer (blue-sensitive layer): | |
| Silver halide emulsion spectrally sensitized by Blue Sensitizing Dyes (ExS-1 and ExS-2) ($AgBr_{30}Cl_{70}$; average grain size: 0.35 $\mu$m) | 0.33 |
| Gelatin | 1.00 |
| Cyan Coupler (ExC-2) | 0.57 |
| Ultraviolet Absorbent (Cpd-6) | 0.03 |
| Ultraviolet Absorbent (Cpd-7) | 0.08 |
| High Boiling Point Solvent (Solv-1) | 0.23 |
| Ninth Layer (protective layer): | |
| Gelatin (acid-processed) | 0.51 |
| Antistatic agent (Cpd-1) | 0.03 |
| Snowtex-O (produced by Nissan Kagaku Kogyo KK) | 0.16 |

In each layer, sodium dodecylbenzenesulfonate as an emulsification dispersion aid, ethyl acetate as an auxiliary solvent, Surface Active Agent (Cpd-17) as a coating aid and potassium polystyrenesulfonate as a thickening agent were used.

Figure 2:
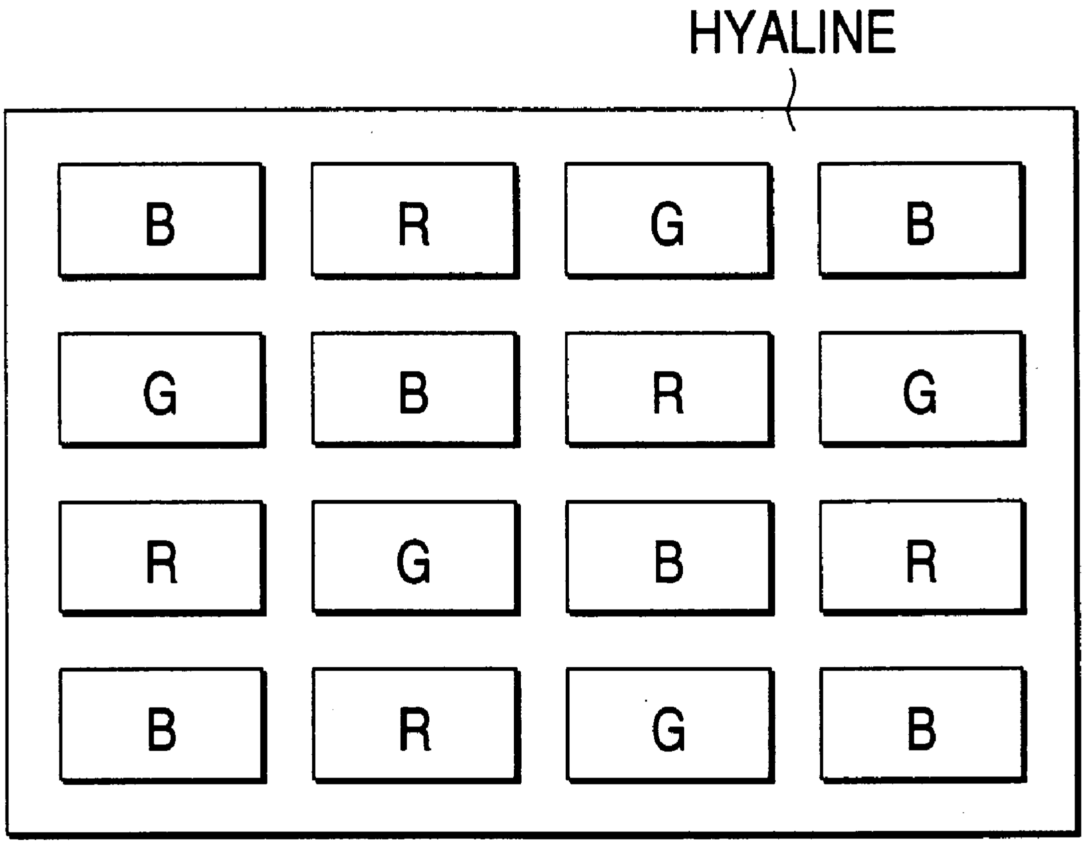
FIG. 2 is a schematic view showing one embodiment of the mask filter which can be used in the present invention.

The thus-prepared color light-sensitive material was subjected to one-shot exposure from the emulsion layer side using a mask filter as shown in FIG. 2, and then developed through the following processing steps to obtain a color filter for having B, G and R three colors and black formed in one operation.

| Processing Step | Temperature (° C.) | Time |
|---|---|---|
| Color development | 38 | 80 sec. |
| Bleach-fixing | 38 | 90 sec. |
| Water washing-1 | 35 | 40 sec. |
| After-hardening | 38 | 3 min. |
| Water washing-2 | 35 | 2 min. |
| Drying | 60 | 2 min. |

Each processing solution had the following composition.

| | |
|---|---|
| Hardening Solution: | |
| Sodium sulfate (anhydrous) | 160.0 g |
| Sodium carbonate (anhydrous) | 4.6 g |
| Glyoxal.propylene glycol adduct (55%) | 20.0 ml |
| Water to make | 1 l |
| pH (25° C.) | 9.5 |
| Color Developer: | |
| Water | 800 ml |
| D-Sorbitol | 0.15 g |
| Sodium naphthalenesulfonate.formalin condensate | 0.15 g |

-continued

| | | |
|---|---|---|
| Pentasodium nitrotris(methylene-phosphonate) | 1.8 | g |
| Diethylenetriaminepentaacetic acid | 0.5 | g |
| 1-Hydroxyethylidene-1,1-diphosphonic acid | 0.15 | g |
| Diethylene glycol | 12.0 | ml |
| Benzyl alcohol | 13.5 | ml |
| Potassium chloride | 6.5 | g |
| Potassium bromide | 0.1 | g |
| Potassium carbonate | 30.0 | g |
| Sodium sulfite | 2.4 | g |
| Disodium N,N-bis(sulfonatoethyl)-hydroxylamine | 8.0 | g |
| Triethanolamine | 6.0 | g |
| Benzotriazole | 0.01 | g |
| N-Ethyl-N-(β-methanesulfonamidoethyl)-3-methyl-4-aminoaniline 3/2 sulfate monohydrate | 6.0 | g |
| Water to make | 1 | l |
| pH (25° C.) | 10.6 | |
| Bleach-Fixing Solution: | | |
| Water | 600 | ml |
| Ammonium thiosulfate (750 g/l) | 160 | ml |
| Ammonium sulfite | 40.0 | g |
| Ammonium ethylenediaminetetraacetato ferrate | 55.0 | g |
| Ethylenediaminetetraacetic acid | 5.0 | g |
| Ammonium nitrate | 10.0 | g |
| Ammonium bromide | 25.0 | g |
| Water to make | 1 | l |
| pH (25° C.) | 6.0 | |
| Washing Water: | | |
| Deionized water having an electric conductivity of 5 μS or less | | |
| After-Hardening Solution: | | |
| Aqueous solution containing 10% of glutaraldehyde. | | |
| The protective layer is described below. | | |
| Overcoating solution: | | |
| Compound M-6 | 6.5 | g |
| Compound M-5 | 0.65 | g |
| Compound P-1 represented by Formula (I) | 0.76 | g |
| Compound P-2 represented by Formula (I) | 0.22 | g |
| Photopolymerization initiator I-1 | 0.21 | g |
| X-1 | 0.07 | g |
| MEK | 40.8 | ml |

The thus-prepared Overcoating Solution 101 was coated on the color filter prepared above to have a dry thickness of 2 μm, and after drying at 90° C., light of 450 mj/cm$^2$ was irradiated using a metal halide lamp to harden the protective layer. Thus, Color Filter 401 having a protective layer of the present invention was obtained.

Separately, overcoating solutions were prepared by changing the composition of the polymerizable compounds and the compounds represented by Formula (I) as shown in Table below, and processed in the same manner as above to obtain Color Filters 402 to 406 each having a protective layer, according to the present invention, and a color Filter 407 having no protective layer for comparison.

TABLE 8

Composition of Each Overcoating Solution

| | Polymerizable compound | | Compound represented by Formula (I) | |
|---|---|---|---|---|
| 402 | M-4 | 7.15 g | P-1 | 0.98 g |
| 403 | M-8 | 5.0 | P-1 | 0.76 |
| | M-12 | 2.15 | P-2 | 0.22 |
| 404 | M-14 | 7.15 | P-3 | 0.10 |

TABLE 8-continued

| | | | | |
|---|---|---|---|---|
| 405 | M-13 | 6.5 | P-4 | 0.69 |
| | | | P-5 | 0.19 |
| 406 | M-6 | 2.5 | | — |
| | M-5 | 3.0 | | |
| | M-12 | 1.65 | | |
| 407 | no protective layer | | | |

P-1

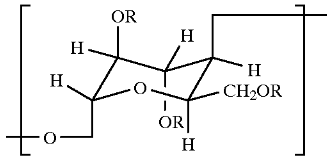

Substitution degree: R = $CH_3$: 2 wt %; $C_4H_9$: 53 wt %
(CAB551, produced by Kodak Chemical)

P-2: Substitution degree: R = $CH_3$: 3 wt %; $C_4H_9$: 50 wt %
(CAB531, produced by Kodak Chemical)

I-1

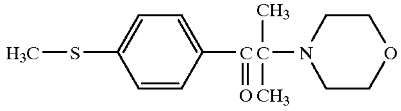

X-1

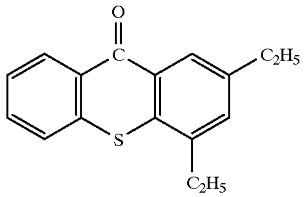

P-3: Substitution degree: R = $CH_3$: 13.5 wt %; $C_4H_9$: 38.0 wt %
(CAB381, produced by Kodak Chemical)

P-4: Substitution degree: R = $CH_3$: 29.5 wt %; $C_4H_9$: 17.0 wt %
(CAB171, produced by Kodak Chemical)

P-5: Substitution degree: R = $CH_3$: 2.5 wt %; $C_4H_9$: 45.0 wt %
(CAB482, produced by Kodak Chemical)

These color filters were examined on the adhesion between the color filter layer after leaving stand at 60–95% RH for 72 hours and the protective layer, and chemicals resistance against organic solvents such as hydrochloric acid, sodium hydroxide and acetone/MIBK. As a result, color filters having an overcoat layer had good adherence between the color filter layer and the overcoat layer, and good chemicals resistance. Using the color filter thus manufactured, a color liquid-crystal panel comprising a plastic film substrate was prepared.

According to the present invention, a color filter reduced in defects, suitable for mass production and high in the reliability under high humidity conditions, can be provided without requiring any complicated process. Furthermore, the color filter having a protective layer formed by coating the specific coating agent according to the present invention exhibits excellent adhesion to a color filter mainly using gelatin as the binder, and also exhibits excellent chemical resistance.

While the invention has been described in detail and with reference to specific examples thereof, it will be apparent to one skilled in the art that various changes and modifications can be made therein without departing from the spirit and scope thereof.

What is claimed is:

1. A process for manufacturing a color filter using a silver halide light-sensitive material comprising a support having thereon at least a light-sensitive silver halide, a color coupler and a hydrophilic binder, which process comprises the steps of:

processing the silver halide light-sensitive material to obtain a color filter layer formed on the support, the color filter layer having a swelling ratio with water at 40° C. of 200% or less; and coating the color filter layer with a water-impermeable protective film having a thickness of from 0.1 to 10 $\mu$m, wherein the protective film is formed by:

coating a composition containing at least a polymerizable compound having an ethylenic unsaturated group and a polymerization initiator on the color filter layer; and applying either or both of light and heat energy thereon to polymerize the polymerizable compound simultaneous with or after the coating, wherein the composition containing a polymerizable compound and a polymerization initiator further contains at least one compound represented by the following formula (I):

Formula (I)

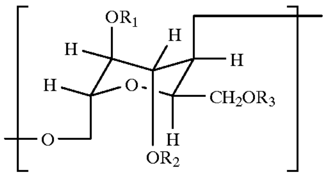

wherein $R_1$ to $R_3$ each independently represents a hydrogen atom, an alkyl group, an aralkyl group, an alkenyl group, an alkynyl group, —$COR_4$, wherein $R_4$ represents a hydrogen atom, an alkyl group, an aryl group, an amino group or an alkoxy group, a nitro group, a sulfonic acid group, a cyano group or an amidino group.

2. The process for manufacturing a color filter as claimed in claim 1, wherein said processing of the silver halide light-sensitive material to provide the color filter layer comprises the steps of pattern exposing, color developing and desilvering, and wherein said coating is conducted after dipping the color filter layer in an aqueous solution containing from 1 to 50% of a compound having at least one aldehyde group in its molecule at a temperature of from room temperature to 50° C. for from 10 seconds to 10 minutes.

3. The process for manufacturing a color filter as claimed in claim 1, wherein the protective film is obtained by hardening a prepolymer having two or more epoxy groups in its molecule.

4. The process for manufacturing a color filter as claimed in claim 1, wherein the polymerization initiator is a photopolymerization initiator and the polymerizable compound is polymerized by applying at least light energy.

5. The process for manufacturing a color filter as claimed in claim 1, wherein the color filter layer is processed to have a swelling ratio of 180% or less, before being coated with a protective film.

6. The process for manufacturing a color filter as claimed in claim 5, wherein the protective film is obtained by hardening a prepolymer having two or more epoxy groups in its molecule.

* * * * *